United States Patent

Muto

Patent Number: 5,872,668
Date of Patent: Feb. 16, 1999

[54] WAVESHAPING CIRCUIT FOR SHAPING AN ANALOG WAVEFORM HAVING UNEQUAL POSITIVE AND NEGATIVE PEAK LEVELS SO THAT THE POSITIVE AND NEGATIVE PEAK LEVELS ARE EQUAL

[75] Inventor: Hiroshi Muto, Kawasaki, Japan

[73] Assignee: Fujitsu Limited, Kawasaki, Japan

[21] Appl. No.: 895,105

[22] Filed: Jul. 16, 1997

Related U.S. Application Data

[62] Division of Ser. No. 617,693, Mar. 19, 1996.

[30] Foreign Application Priority Data

Mar. 20, 1995 [JP] Japan ................................. 7-060711

[51] Int. Cl.$^6$ ........................................................ G11B 5/35
[52] U.S. Cl. .......................... 360/65; 375/229; 375/290; 375/340
[58] Field of Search .............................. 360/46, 65, 137, 360/45, 40; 340/855.3; 375/287, 229, 230, 232, 233, 290, 340

[56] References Cited

U.S. PATENT DOCUMENTS

| 4,805,190 | 2/1989 | Jaffr'e et al. ............................. 375/287 |
| 5,010,333 | 4/1991 | Gardner et al. ...................... 340/855.3 |
| 5,168,413 | 12/1992 | Coker et al .............................. 360/137 |
| 5,442,492 | 8/1995 | Cunningham et al. .................... 360/46 |
| 5,469,462 | 11/1995 | Kahlman et al. ...................... 360/65 X |

FOREIGN PATENT DOCUMENTS

| 1165070 | 6/1989 | Japan . |
| 4157605 | 5/1992 | Japan . |
| 5081606 | 4/1993 | Japan . |
| 5101315 | 4/1993 | Japan . |
| 5198097 | 8/1993 | Japan . |
| 5266403 | 10/1993 | Japan . |

*Primary Examiner*—Aristotelis M. Psitos
*Assistant Examiner*—Patrick Wamsley
*Attorney, Agent, or Firm*—Greer, Burns & Crain, Ltd.

[57] ABSTRACT

An analog waveshaping circuit is capable of performing waveshaping of an AC analog signal in which the positive and negative peak levels with respect to a reference level are not the same, while considering a DC offset component of the reference level of the analog waveform, so that the positive and negative levels with respect to the reference level are made equal. The analog signal waveshaping circuit to do this is formed by a (1+D) equalizing circuit, an interference detecting circuit which, if the input and output signals of the means for equalizing being X(n) and Y(n), respectively and the interference state from signal X(n) to signal Y(n) is S(n) at the time n, uses a signal X(n) 3-value comparator circuit, a signal Y(n) 3-value comparator circuit, and a state processing circuit to calculate what interference condition occurred of the 7 possible types which are possible from the three values that the signal X(n) can take to the three values that the signal Y(n) can take, this being output by the interference detecting circuit as the interference state S(n), a compensation constant generating circuit which classifies the interference state S(n) into three classes and stores these, and which performs further processing to detect a compensation constant and the DC offset contained in the signal Y(n), an amplitude compensating circuit which compensates the amplitude of the signal Y(n) in accordance with the compensation constant from the compensation constant generating circuit, and a data detecting circuit.

11 Claims, 33 Drawing Sheets

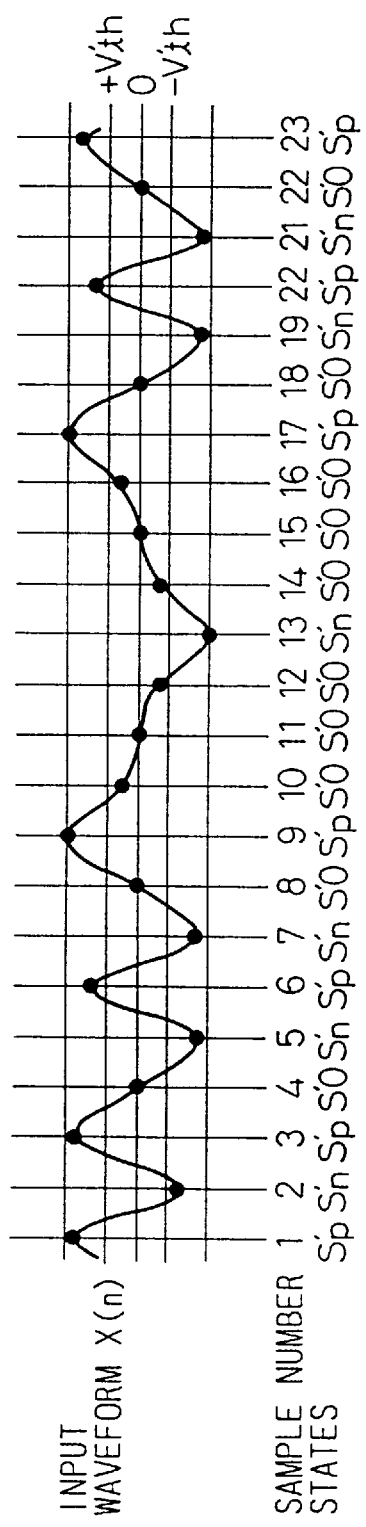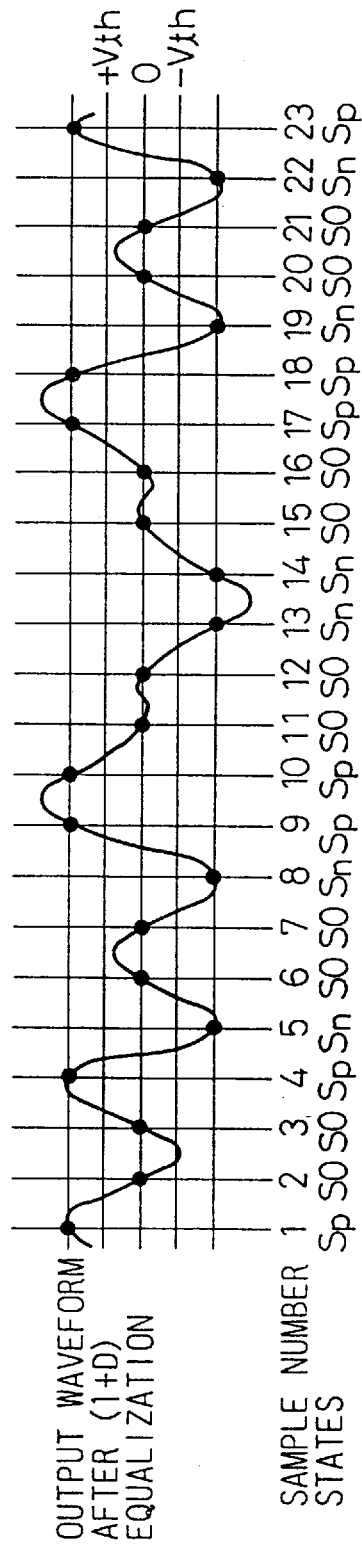

Vp: TRUE POSITIVE PEAK HEIGHT
Vn: TRUE NEGATIVE PEAK HEIGHT
Vdc: DC OFFSET
Yn: VALUE OF SAMPLE Y(n) AFTER EQUALIZATION WHEN THE STATE S(n) IS S0n OR Snn
Yp: VALUE OF SAMPLE Y(n) AFTER EQUALIZATION WHEN THE STATE S(n) IS Spp OR S0p
Y00: VALUE OF SAMPLE Y(n) AFTER EQUALIZATION WHEN THE STATE S(n) IS S00
Y0: VALUE OF SAMPLE Y(n) AFTER EQUALIZATION WHEN THE STATE S(n) IS Sp0 OR Sn0

WAVESHAPING CIRCUIT FOR SHAPING AN ANALOG WAVEFORM HAVING UNEQUAL POSITIVE AND NEGATIVE PEAK LEVELS SO THAT THE POSITIVE AND NEGATIVE PEAK LEVELS ARE EQUAL

This is a divisional of copending application Ser. No. 08/617,693 filed on Mar. 19, 1996.

BACKGROUND OF THE INVENTION

1. Field of the Invention

The present invention relates to a waveshaping circuit for an analog signal, and more specifically to a circuit which shapes an analog signal which should have the same peak value (absolute value) for positive and negative peaks, so that the positive and negative peak values are the same. Yet more specifically, the present invention relates to a circuit which detects and corrects the positive/negative asymmetry of an analog waveform with respect to a proper reference level for the analog signal, considering the condition in which there is a DC offset component in the reference level of the analog signal, so that the positive and negative peak values of the waveform are the same.

2. Description of Related Art

In the past, when recording data or when reading data using an AC analog signal, processing was facilitated if the amplitude with respect to a reference level exhibited positive/negative symmetry. Stated differently, signal processing is easier when the positive-side and negative-side peaks of the analog signal with respect to the reference level are the same. In a magnetic disk, a playback signal read by using an inductive head has positive-side and negative-side peak values with respect to the reference level that are almost the same. In contrast to this, when reading data using a magnetic resistance effect head (hereinafter referred to as an MR head), the positive and negative peaks with respect the reference level differ. As a result, the configuration of the circuit used to demodulate the playback signal from an MR head becomes complex. Therefore, there is a desire for a magnetic disk apparatus using an MR head which enables simplification of the configuration of the circuit used to demodulate the playback signal from the MR head.

In recent years, with an increase in the speed of computer systems, there have also been demands for high speed and large capacity with respect to magnetic disk apparatuses used as external storage devices. For this reason, the frequency of the signals processed in the demodulation circuit of magnetic disk apparatuses have increased, with an accompanying increase in the density of the recording onto the recording medium. In magnetic disk apparatuses in the past, while a single thin-film head was used for both recording and playback, because a thin-film head uses the method of detecting the amount of change of magnetic flux per unit time of the rotating disk, near the center of the disk, at which the speed of the disk is slow, it is difficult to read data, making it difficult to achieve a large capacity.

Because of the above-noted situation, to improve the signal quality when performing high-density recording, a compound MR head, in which a head dedicated to reading of data from the disk is combined with the thin-film head of the past, has reached the stage of practical use. Because data is read the MR head only by the strength of the magnetic flux of the disk, by using the MR head it is possible to read data from the entire disk surface.

However, because of the low conversion efficiency of an MR head, while it has advantages such as a large signal output when performing high-density recording, the signal waveform often has positive and negative peak values with respect to the signal reference level which are not equal. For this reason, when demodulating a signal played back using an MR head, which has positive and negative peak values that mutually differ, the problem of the occurrence of a large number of demodulation errors occurs, this causing a worsening of the error rate.

Also, unless the signal path in the demodulation circuit is directly linked in the DC sense, an analog signal read using an MR head and which has positive and negative peak values that are different is transmitted to the demodulation circuit as a signal waveform which includes a DC offset component, so that what should remain as the proper reference level is corrupted by the DC offset level, making it difficult to perform correction when the positive and negative peak values differ.

SUMMARY OF THE INVENTION

An object of the present invention is to provide a waveshaping circuit for shaping an analog waveform, which considers not only the positive and negative signal levels of the analog signal, but also the DC offset component of the AC analog signal reference level, and which performs compensation thereof so as to shape the waveform, thereby forming an analog signal having positive and negative peak values that are equal.

To achieve the above-noted object, in the first aspect of an analog waveshaping circuit according to the present invention, waveshaping is performed by detecting and compensating for the difference between the positive and negative peaks, with respect to the proper reference level of the input signal, while considering the DC offset component of the reference level, this waveshaping circuit having the following five parts:

(1) means for equalizing, which performs (1+D) equalization of an input signal, where the delay is expressed as D;

(2) means for detecting interference, and with input and output signals of the means for equalizing being $X(n)$ and $Y(n)$, respectively and the interference state from signal $X(n)$ to signal $Y(n)$ being $S(n)$ at the time n, this means for detecting interference having a first means for 3-value judging which performs a 3-value judgment of the signal $X(n)$ with a threshold value of $V'th$, a second means for judging which performs a 3-value judgment of the signal $Y(n)$ with a threshold value of $Vth$, and means for processing states which calculates which of the 7 possible interference states <1> Spp, a transition from a positive value $S'p$ of the signal $X(n)$ to a positive value $Sp$ of the signal $Y(n)$, <2> Sp0, a transition from a positive value $S'p$ of the signal $X(n)$ to a 0 value $S0$ of the signal $Y(n)$, <3> S0p, a transition from a 0 value $S'0$ of the signal $X(n)$ to a positive value $Sp$ of the signal $Y(n)$, <4> S00, a transition from a 0 value $S'0$ of the signal $X(n)$ to a 0 value $S0$ of the signal $Y(n)$, <5> S0n, a transition from a 0 value $S'0$ of the signal $X(n)$ to a negative value $Sn$ of the signal $Y(n)$, <6> Sn0, a transition from a negative value $S'n$ of the signal $X(n)$ to a 0 value $S0$ of the signal $Y(n)$, and <7> Snn, a transition from a negative value $S'n$ of the signal $X(n)$ to a negative value $Sn$ of the signal $Y(n)$, which can occur from the three values $S'p$, $S'0$, and $S'n$ that the signal $X(n)$ can take to the three values $Sp$, $S0$, and $Sn$ that the signal $Y(n)$ can take, has occurred, and which outputs this as the interference state $S(n)$;

(3) means for compensation constant generation which classifies the interference state S(n) which is detected by the means for detecting interference, into at least three classes and stores these, performing processing of the stored values after averaging processing of the stored values, after which a compensation constant and the DC offset level contained in the signal Y(n) are detected, this DC offset level being input to the means for equalizing;

(4) means for amplitude compensation which has the signal Y(n) input to it, and which compensates for the amplitude of this signal in accordance with the amplitude compensation constant from the means for compensation constant generation; and (5) means for detecting which detects data from the output of the means for amplitude compensation.

To achieve the above-noted object, in the second aspect of an analog waveshaping circuit according to the present invention, waveshaping is performed by detecting and compensating for the difference between the positive and negative peaks, with respect to the proper reference level of the input signal, while considering the DC offset component of the reference level, this waveshaping circuit having the following four parts:

(1) means for equalizing, this means having an analog pre-filter, an A/D converter which performs A/D conversion of the output from the above-noted analog pre-filter, and a cosine-type equalizer which digitally performs cosine equalization of the output of the above-noted A/D converter, this means for equalizing performing (1+D) equalization of the input signal, where the delay time is expressed as D;

(2) means for detecting interference which, if at the point in time n the input and output signals of the means for equalizing are X(n) and Y(n), respectively, and the interference state from the signal X(n) to the signal Y(n) is S(n), has a first means for 3-value judging which performs a 3-value judgment of the signal X(n) with a threshold value of V'th, a second means for judging which performs a 3-value judgment of the signal Y(n) with a threshold value of Vth, and means for processing states which calculates which of the 7 possible interference states Spp, S0p, Sp0, S00, Sn0, S0n, and Snn which can occur from the three values S'p, S'0, and S'n that the signal X(n) can take to the three values Sp, S0, and Sn that the signal Y(n) can take, has occurred, and which outputs this as the interference state S(n);

(3) means for generating a reference voltage which classifies the signal Y(n) into at least three classes, based on the interference state S(n), which are detected by the means for detecting interference, and stores the classified signal Y(n), performs processing of the stored values after averaging processing of the stored values, after which a reference voltage is generated, the above-noted reference voltage setting the reference of the A/D converter; and (4) means for detecting which detects data from the output of the means for amplitude compensation.

To achieve the above-noted object, in the third aspect of an analog waveshaping circuit according to the present invention, waveshaping is performed by detecting and compensating for the difference between the positive and negative peaks, with respect to the proper reference level of the input signal, while considering the DC offset component of the reference level, this waveshaping circuit having the following five parts:

(1) means for A/D conversion of an input signal to a digital form;

(2) means for equalizing, which is connected to the output of the above-noted means for A/D conversion, and which performs (1+D) conversion of the input signal, where the delay is expressed as D;

(3) means for detecting interference which, if at the point in time n the input and output signals of the means for equalizing are X(n) and Y(n), respectively, and the interference state from the signal X(n) to the signal Y(n) is S(n), has a first means for 3-value judging which performs a 3-value judgment of the signal X(n) with a threshold value of V'th, a second means for judging which performs a 3-value judgment of the signal Y(n) with a threshold value of Vth, and means for processing states which calculates which of the 7 interference states Spp, S0p, Sp0, S00, Sn0, S0n, and Snn which can occur from the three values S'p, S'0, and S'n that the signal X(n) can take to the three values Sp, S0, and Sn that the signal Y(n) can take, has occurred, and which outputs this as the interference state S(n);

(4) means for generating a reference voltage which classifies the signal Y(n) into three classes, based on the interference state S(n), which is detected by the means for detecting interference, and stores these, performing processing of the stored values after averaging processing of the stored values, after which a reference voltage is generated, the above-noted reference voltage setting the reference of the A/D converter; and (5) means for detecting which detects data from the output of the means for amplitude compensation.

To achieve the above-noted object, in the fourth aspect of an analog waveshaping circuit according to the present invention, waveshaping is performed by detecting and compensating for the difference between the positive and negative peaks, with respect to the proper reference level of the input signal, while considering the DC offset component of the reference level, this waveshaping circuit having the following five parts:

(1) means for equalizing, which performs (1+D) conversion of the input signal, where the delay is expressed as D;

(2) means for detecting interference which, if at the point in time n the input and output signals of the means for equalizing are X(n) and Y(n), respectively, and the interference state from the signal X(n) to the signal Y(n) is S(n), has a first means for 3-value judging which performs a 3-value judgment of the signal X(n) with a threshold value of V'th, a second means for judging which performs a 3-value judgment of the signal Y(n) with a threshold value of Vth, and means for processing states which calculates which of the 7 interference states Spp, S0p, Sp0, S00, Sn0, S0n, and Snn which can occur from the three values S'p, S'0, and S'n that the signal X(n) can take to the three values Sp, S0, and Sn that the signal Y(n) can take, has occurred, and which outputs this as the interference state S(n);

(3) means for generating a reference voltage which classifies the signal Y(n) into three classes, based on the interference state S(n), which are detected by the means for detecting interference, and stores the classified signal Y(n), performing processing of the stored values after averaging processing of the stored values, after which a reference voltage is generated, the above-noted reference voltage setting the reference of the A/D converter;

(4) means for A/D conversion, which is connected to the output of the means for equalizing and which converts the signal Y(n) to digital form; and (5) means for detecting which detects data from the output of the means for amplitude compensation.

According to the present invention, by detecting the asymmetry of the positive and negative peak values of a signal such as an analog playback signal read using an MR head in a magnetic disk apparatus, and the DC offset component contained in the signal, it is possible to perform waveshaping based on the proper reference level, thereby enabling adjustment of the signal to an analog signal having positive and negative peak values, with respect to the reference level, that are equal, this enabling the achievement of a highly accurate data demodulation system.

BRIEF DESCRIPTION OF THE DRAWINGS

The present invention will be more clearly understood from the description as set forth below, with reference being made to the accompanying drawings, wherein FIG. 1A is a waveform diagram which shows the input waveform to an equalizer of a magnetic disk apparatus, and the values obtained by 3-value judgment of the waveform at each sampling point;

FIG. 1B is a waveform diagram which shows the waveform of FIG. 1A after 1+D equalization by an equalizer, and the values obtained by 3-value judgment of the waveform at each sampling point;

DESCRIPTION OF PREFERRED EMBODIMENTS

The preferred embodiments of the present invention will be described below in detail, with reference being made to the relevant accompanying drawings. Before describing the basic embodiments of the present invention, a description of an analog signal, in which the positive and negative peak values with respect to a reference level are not the same, is presented.

For example, when using an MR head in a playback head of a magnetic disk apparatus, the playback waveform has positive and negative peaks that are not the same with respect to the reference level. Unless the signal path in the demodulation circuit is directly linked in the DC sense, an analog signal read using an MR head and which has positive and negative peak values that are different is transmitted to the demodulation circuit as a signal waveform which includes a DC offset component.

FIG. 1A shows the input waveform X(n) to an equalizer of such an analog signal, which has differing positive and negative peak values. FIG. 1B shows the output waveform Y(n) after receiving 1+D equalization by an equalizer with a delay of D. A 3-value judgment is made of the values of the input waveform X(n) at each sampling point, a point equal to or greater than the positive-side threshold value +V'th being expressed as S'p, a point lower than the negative-side threshold value −V'th being expressed as S'n, and a point equal to or greater than the threshold value −V'th and less than the threshold value +V'th being expressed as S'0. A three-value judgment is also performed on the output waveform Y(n) from the equalizer, a point equal to or greater than the positive-side threshold value +Vth being expressed as Sp, a point lower than the negative-side threshold value −Vth being expressed as Sn, and a point equal to or greater than the threshold value −Vth and less than the threshold value +Vth being expressed as S0.

Summarizing the above, we have the following.

S'p  X(n)≧+V'th
S'0  +V'th>X(n)≧−V'th
S'n  X(n)<−Vth
Sp   Y(n)≧+Vt'th
S0   +Vth>Y(n)≧−Vth
Sn   Y(n)<−Vth

Figure 2:
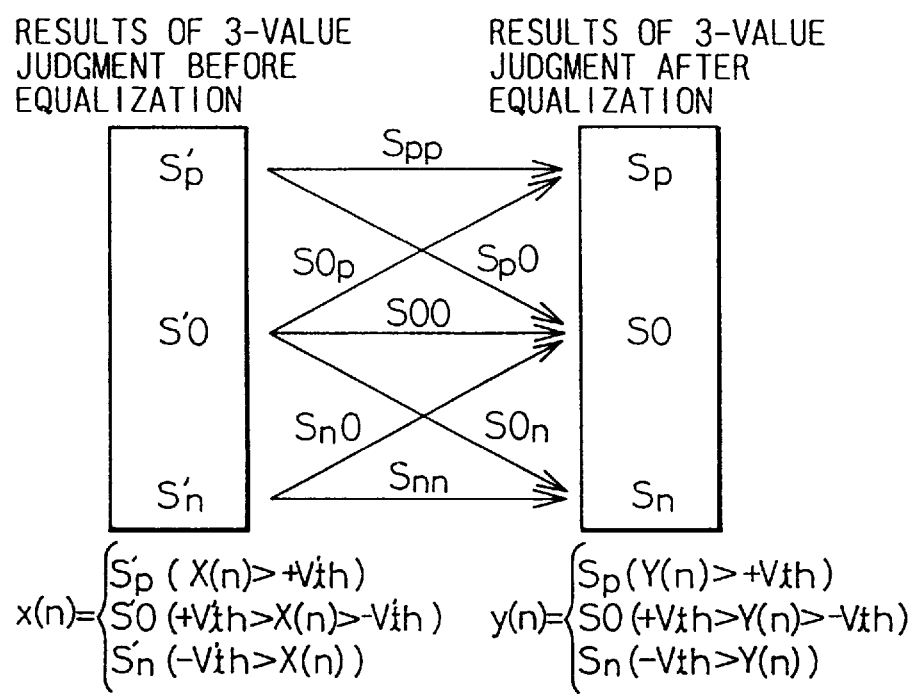
FIG. 2 is a drawing which illustrates the result before and after equalization in FIG. 1A and FIG. 1B, and the predicted state.

If we compare the state transitions of FIGS. 1A and 1B before and after equalization, we see that the 3-value changes are only the seven types shown in FIG. 2. We will express the change (transition) from S'p to Sp as Spp, and the remaining six types Sp0, S0p, S00, S0n, Sn0, and Snn as follows.

<1> Spp is a transition from a positive value S'p of the signal X(n) to a positive value Sp of the signal Y(n).
<2> Sp0 is a transition from a positive value S'p of the signal X(n) to a 0 value S0 of the signal Y(n).
<3> S0p is a transition from a 0 value S'0 of the signal X(n) to a positive value Sp of the signal Y(n).
<4> S00 is a transition from a 0 value S'0 of the signal X(n) to a 0 value S0 of the signal Y(n).
<5> S0n is a transition from a 0 value S'0 of the signal X(n) to a negative value Sn of the signal Y(n).
<6> Sn0 is a transition from a negative value S'n of the signal X(n) to a 0 value S0 of the signal Y(n).
<7> Snn is a transition from a negative value S'n of the signal X(n) to a negative value Sn of the signal Y(n).

Then, for example, the Spp interference state shown in FIG. 2 corresponds to the states of the sample numbers 1, 9, 17, and 23 in FIGS. 1A and 1B. Also, the S00 state in FIG. 2 corresponds to the sample numbers 11, 12, 15, and 16 in FIGS. 1A and 1B. In this manner, it is possible to classify the type of interference at each sample, making it possible to predict what type of interference component is contained in the sampled value at the output of the equalizer.

Figure 3:
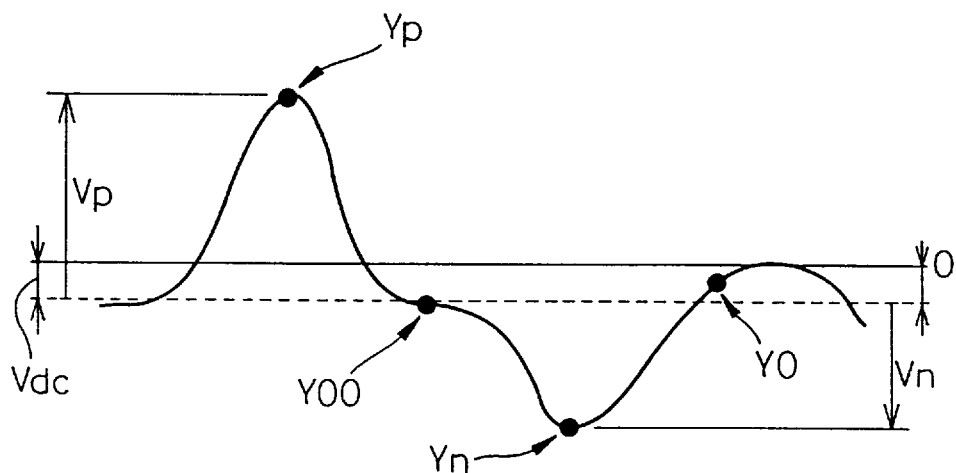
FIG. 3 is a partial waveform diagram which shows an expanded view of part of the waveform of FIG. 1B after equalization.

FIG. 3 shows an expanded view of part of FIG. 1B. In FIG. 3, the dotted line indicates the original zero level before equalization, the other reference symbols indicating the following.

Vp: True positive-side peak height
Vn: True negative-side peak height
Vdc: DC offset component from the reference level
Yn: Value of the equalized sample of Y(n) when the state S(n) is S0n, Snn
Yp: Value of the equalized sample of Y(n) when the state S(n) is Spp, S0p
Y00: Value of the equalized sample of Y(n) when the state S(n) is S00
Y0: Value of the equalized sample of Y(n) when the state S(n) is Sp0, Sn0

If when the state S(n) is Spp or S0p, the sampled Y(n) after equalization is Yp, that value is Vp−Vdc. In the same manner, if when the state S(n) is S00 the sampled Y(n) after equalization is Y00, when the state S(n) is Sp0 or Sn0 the sampled Y(n) after equalization is Y0, and when the state S(n) is S0n or Snn the sampled Y(n) after equalization is Yn, the corresponding values are as follows.

$$Yp = Vp - Vdc \tag{1}$$

$$Y00 = -Vdc \tag{2}$$

$$Y0 = Vp - Vn - Vdc \tag{3}$$

$$Yn = Vn - Vdc \tag{4}$$

Therefore, the true peak heights Vp and Vn can be determined from equations (1) through (4) as follows.

$$Vp = Yp - Y00 \tag{5}$$

or $$Vp = Y0 + Yn \tag{7}$$

$$Vn = Yn - Y00 \tag{6}$$

or $$Vn = Yp + Y0 \tag{8}$$

The error component Vp−Vn due to the difference between the positive and negative peak values can be determined from equations (5) through (8) as follows.

$$Vp - Vn = Y0 - Y00 \tag{9}$$

or $$Vp - Vn = Yp - Yn - 2Y00 \tag{10}$$

or $$Vp - Vn = 2Y0 - Yp + Yn \tag{11}$$

In this manner, compensation is performed by considering not only the positive and negative signal levels of an analog signal having different positive and negative peak values with respect to a reference level, but by considering the DC offset component as well. That is, the amount of this DC offset and the difference between the true positive and negative peak levels in consideration of this offset are detected, this being used as the basis for appropriate compensation. In the present invention, to detect the difference between the positive and negative peak values and the DC offset, a 3-value comparison is performed between the input and output signals of a (1+D) equalizer used in partial response class 4 equalization, the interference states of the recognition points after equalization being determined. Specifically, what type of component (true positive peak value, true negative peak value, DC offset value) is included in the signal amplitude at the recognition point is determined from the interference state, this being used as the basis for accurate determination of the true positive and negative peak values.

Figure 4:
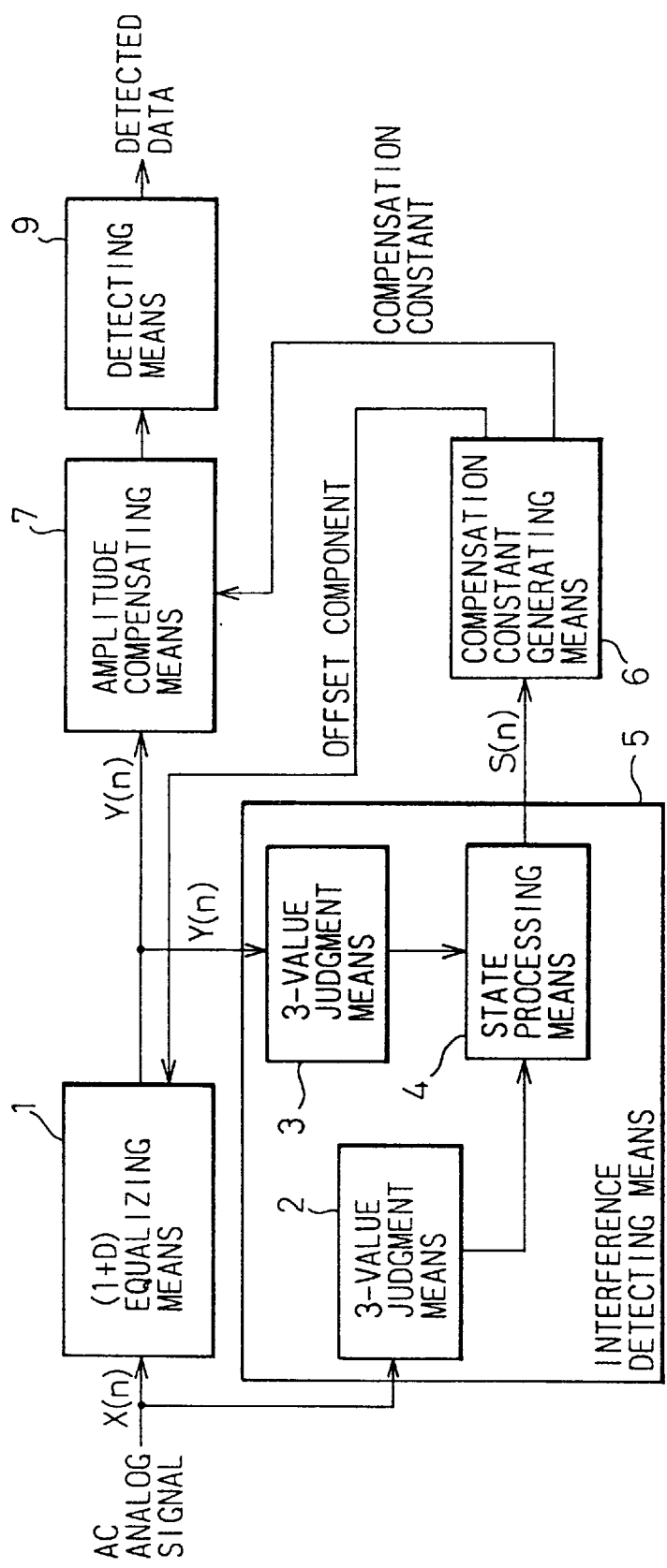
FIG. 4 is a block diagram which shows the basic configuration of the first aspect of an analog signal waveshaping circuit according to the present invention.

FIG. 4 shows a configuration which illustrates the principle of the first aspect of an analog signal waveshaping circuit according to the present invention. As shown in FIG. 1, in the first aspect of an analog signal waveshaping circuit according to the present invention, waveshaping is performed by detecting and compensating for the difference between the positive and negative peaks, with respect to the proper reference level of the input signal, while considering the DC offset component of the reference level. The first aspect of the analog waveshaping circuit is formed by an interference detecting means 5, this being formed in turn by a (1+D) equalizing means 1, 3-value judging means 2 and 3, and a state processing means 4, a compensation constant generating means 6, an amplitude compensating means 7, and a detecting means 9.

The (1+D) equalizing means 1 performs (1+D) equalization when the delay is expressed by D. The 3-value judging means 2 performs a 3-value judgment of the signal X(n) with a threshold value of V'th, with the input signal and output signal of the equalizing means 1 at point n being X(n) and Y(n), respectively, and the interference state from signal X(n) to signal Y(n) being S(n). The 3-value judging means 3 performs a 3-value judgment of the signal Y(n) with a threshold value of Vth. The state processing means 4 calculates which of the states <1> Spp, a transition from a positive value S'p of the signal X(n) to a positive value Sp of the signal Y(n), <2> Sp0, a transition from a positive value S'p of the signal X(n) to a 0 value S0 of the signal Y(n), <3> S0p, a transition from a 0 value S'0 of the signal X(n) to a positive value Sp of the signal Y(n), <4> S00, a transition from a 0 value S'0 of the signal X(n) to a 0 value S0 of the signal Y(n), <5> S0n, a transition from a 0 value S'0 of the signal X(n) to a negative value Sn of the signal Y(n), <6> Sn0, a transition from a negative value S'n of the signal X(n) to a 0 value S0 of the signal Y(n), and <7> Snn, a transition from a negative value S'n of the signal X(n) to a negative value Sn of the signal Y(n), which can occur from the three values S'p, S'0, and S'n that the signal X(n) can take to the three values Sp, S0, and Sn that the signal Y(n) can take, has occurred, this being output as the interference state S(n). The compensation constant generating means 6 classifies the interference state S(n), which is detected by the interference detecting means, which has 3-value judging means 2 and 3, and state processor 4, into at least three classes and stores these, performing processing of the stored values after averaging processing of the stored values, after which a compensation constant and the DC offset level contained in the signal Y(n) are detected, this DC offset level being input to the equalizing means 1. The amplitude compensating means 7 has the signal Y(n) input to it, and compensates the amplitude of this signal in accordance with the amplitude compensation constant from the compensation constant generating means 6. The detecting means 9 performs detection of the data from the output of the amplitude compensating means 7.

At this point the first aspect of an analog waveform shaping circuit according to the present invention will be described, using the example of specific embodiments for the case of an analog playback signal read from an MR head magnetic disk apparatus, this signal having positive and negative peak values which differ.

Figure 5:
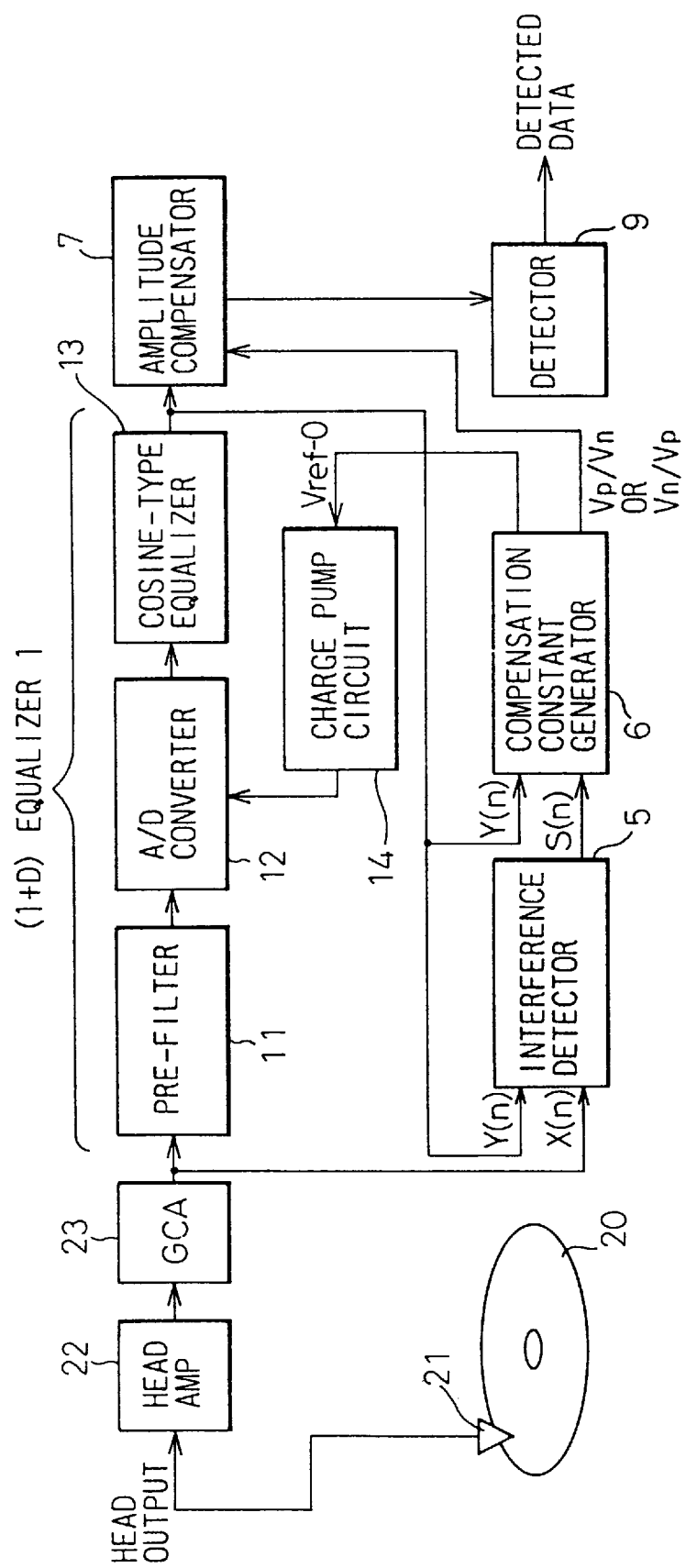
FIG. 5 is a circuit block diagram which shows the configuration of the first embodiment of an analog waveform waveshaping circuit according to the present invention.

FIG. 5 is a circuit block diagram which shows the configuration of the first embodiment of an analog signal waveshaping circuit according to the present invention, in which the present invention is applied to a magnetic disk apparatus.

In this embodiment, a head output which is read by an MR head 21 from a magnetic disk 20 is amplified by an amplifier 22, passes through a gain-controlled amplifier (GCA) 23, the gain of which can be varied, and is then input to an equalizer 1, which has (1+D) characteristics. In this embodiment, the equalizer 1 is formed by an analog pre-filter 11, an A/D converter 12 which performs A/D conversion on the output of the filter 11, and a cosine-type equalizer 13, which digitally performs cosine equalization of the output of the A/D converter 12.

The output signal X(n) of the GCA 23 and the output signal Y(n) of the cosine-type equalizer 13 are each input to an interference detector 5. The interference detector 5 makes a judgment as to interference, in accordance with the signal states of the signal X(n) at the input of the analog pre-filter 11 and the output signal Y(n) of the cosine-type equalizer 13, this being output as the interference state S(n), which is input to the compensation constant generator 6.

At the compensation constant generator 6, the compensation constant Vp/Vn or Vn/Vp is generated, based on the state information of the signal S(n) from the interference detector 5 and the signal Y(n) from the cosine-type equalizer 13, this compensation constant being input to the amplitude compensator 7. At the amplitude compensator 7, based on the compensation constant which is generated by the compensation constant generator 6, the output signal Y(n) of the cosine-type equalizer 13 is compensated, the thus-compensated signal being input to a detector 9, at which data is detected. At the compensation constant generator 6, a zero-level reference information Vref-0 for the A/D converter 12 is generated, this zero-level reference information Vref-0 being input to the A/D converter 12 via an integrating charge pump circuit 14. At the A/D converter 12, the zero level is set in accordance with this zero-level reference information Vref-0.

Figure 6:
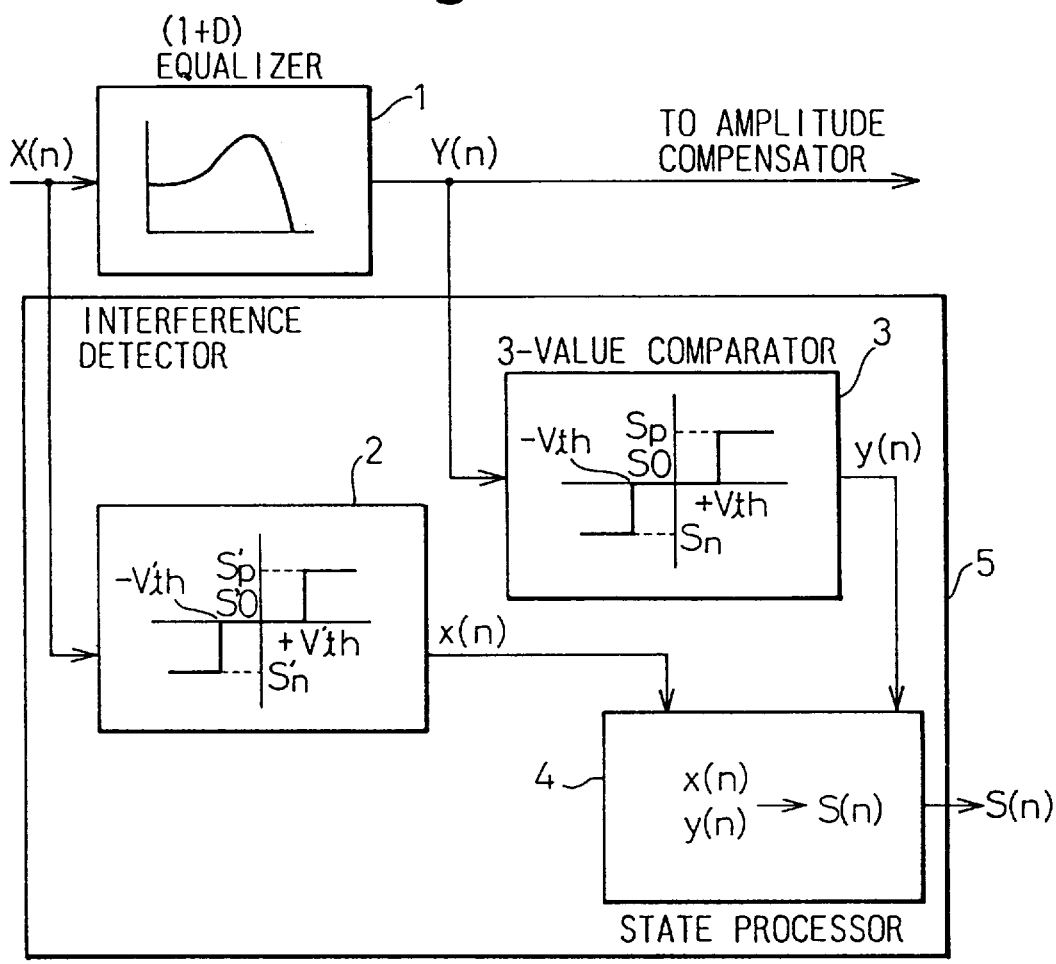
FIG. 6A is a circuit block diagram which shows the configuration of an interference detector of FIG. 5.
FIG. 6B is a map which shows the operational map of the state processor of FIG. 6A.

FIG. 6A is a circuit block diagram which shows an example of the configuration of the interference detector 5 of FIG. 5. This interference detector 5 has the two 3-value comparators 2 and 3 an a state processor 4. For this purpose of this description, at the point in time n, the input signal of the equalizer 1 is X(n), the output signal is Y(n), and the interference state from signal X(n) to signal Y(n) is S(n). The 3-value comparator 2 is set with a threshold value of ±V'th, and performs a 3-value comparison of the signal X(n). The 3-value comparator 3 is set with a threshold value of ±V'th, and performs a 3-value comparison of the signal Y(n).

At the 3-value comparator 2, as a result of the 3-value comparison of the signal X(n), the following three types of signal x(n) are output.

For $X(n) \geq +V'th$, $x(n) = S'p$

For $+V'th > X(n) \geq -V'th$, $x(n)=S'0$

For $X(n) < -V'th$, $x(n)=S'n$

At the 3-value comparator 3, as a result of the 3-value comparison of the signal Y(n), the following three types of signal y(n) are output.

For $Y(n) \geq +Vth$, $x(n)=Sp$

For $+Vth > Y(n) \geq -Vth$, $x(n)=S0$

For $Y(n) < -Vth$, $x(n)=Sn$

At the state processor 4, the output signal S(n) is calculated in accordance with the signals x(n) and y(n), based on the map shown in FIG. 6B, the seven types of signals Spp through Snn being output.

Figure 7:
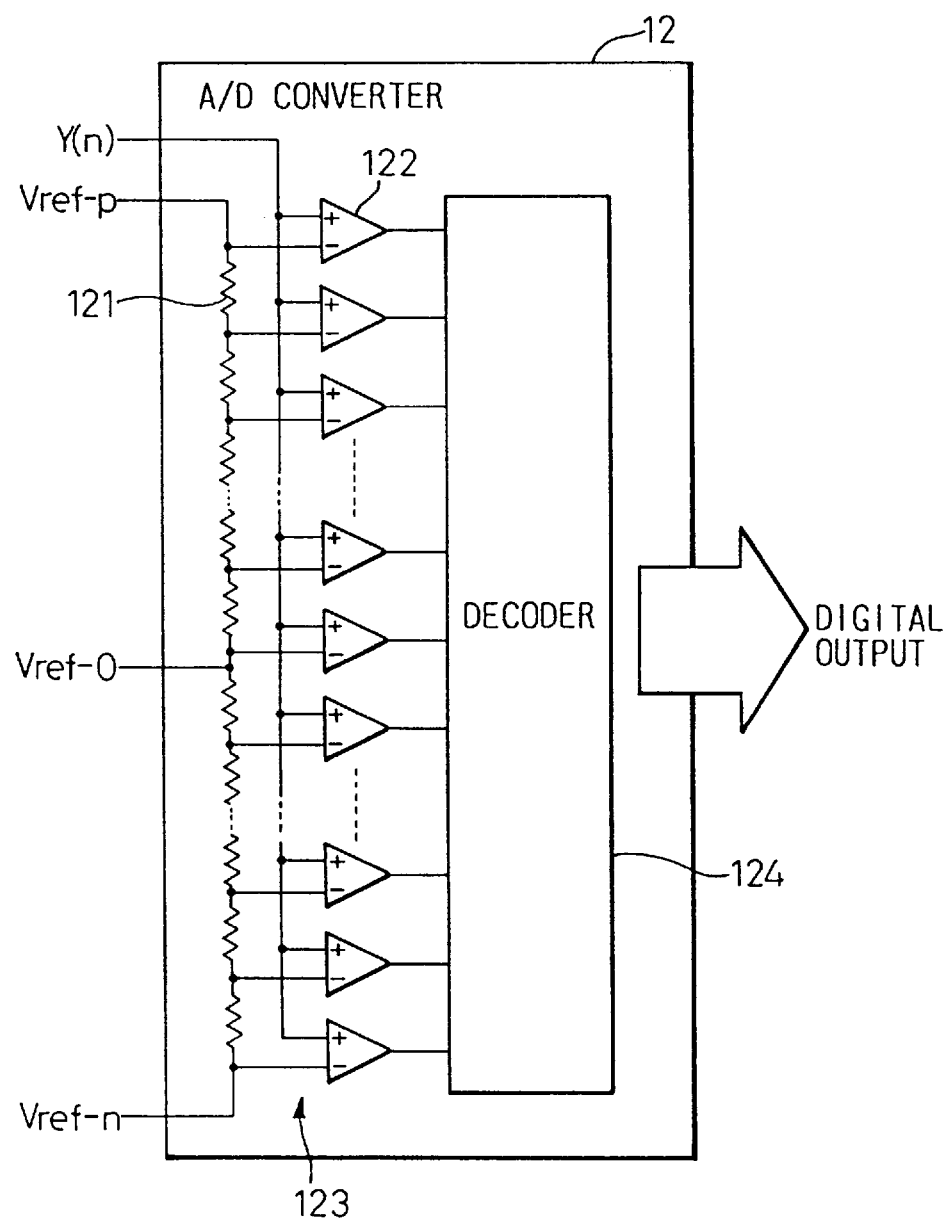
FIG. 7 is a drawing which shows the configuration of the A/D converter of FIG. 5.

FIG. 7 is a drawing which shows the configuration of the A/D converter 12 of FIG. 5. This A/D converter 12 is provided with a level-determining circuit 123, which has a resistive ladder circuit formed from a plurality of resistors 121 and comparators 122, and a decoder 124 which converts the levels determined for each bit into a digital value of a prescribed number of bits. The signal Y(n) is directly connected to the non-inverting input of each of the operational amplifiers 122, and to the inverting input of each of the operational amplifiers 122 is connected a connection point between the series of resistors 121, this serving as a reference voltage for each bit. A positive-side reference voltage Vref-p is input to the positive end of this series of resistors 121, a negative-side reference voltage Vref-n is input to the negative end, and a zero-level reference voltage Vref-0 is connected at the center point of the series of resistors 121.

By means of an above-noted A/D converter the signal Y(n) is converted to a digital signal of a prescribed number of bits responsive to the number of comparators 122, based on a proper zero-level reference voltage Vref-0, and positive and negative reference voltages Vref-p an Vref-n, respectively.

Figure 8:
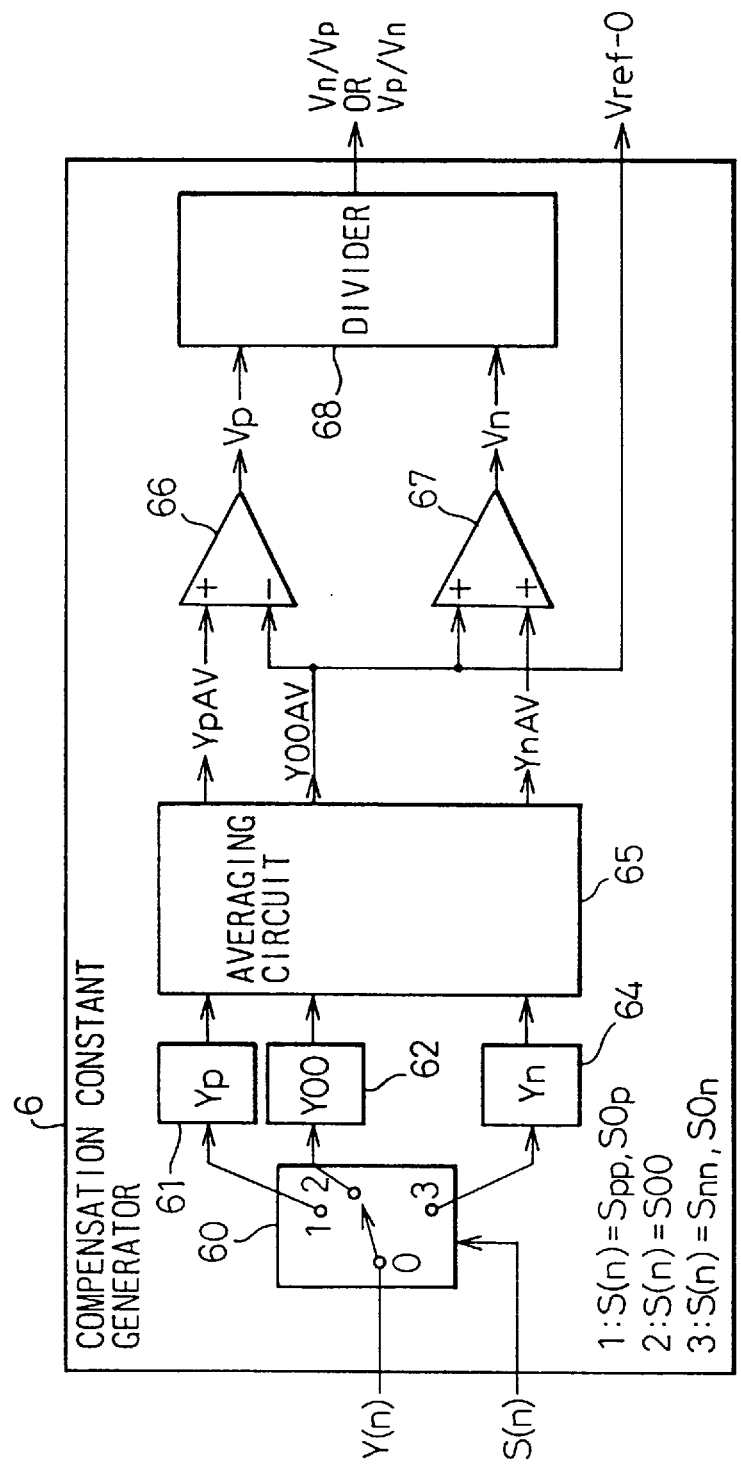
FIG. 8 is a block diagram which shows an example of the configuration of the constant generator of FIG. 5.

FIG. 8 is a drawing which shows an example of the configuration of the constant generator 6 of FIG. 5. This constant generator 6 has a selector 60, registers 61, 62, and 64, an averaging circuit 65, a subtractor 66, an adder 67, and a divider 68. The selector 60 connects the contact 0, to which is input the signal Y(n), to one of the contacts 1 through 3, in response to the output signal (interference state) from the interference detector 5. When the interference state S(n) at time n is the above-noted Spp or Sop, contact 0 is connected to contact 1, when S(n)=S00 contact 0 is connected to contact 2, and when S(n)=Snn or S0n contact 0 is connected to contact 3.

Register 61 is connected to contact 1, register 62 is connected to contact 2, and register 64 is connected to contact 3. In this arrangement, the value of the signal Y(n) stored in register 61 is Yp, the value of Y(n) stored in register 62 is Y00, and the value of Y(n) stored in register 64 is Yn.

At the averaging circuit 65, the values of Yp, Y00, and Yn which are stored each individually in registers 61, 62, and 64 are averaged each prescribed amount of time, the resulting averaged values being output as YpAV, Y00AV, and YnAV. At the subtractor 66, processing is performed to subtract the average value Y00AV which is stored in the register 62 from the average value YPAV of the value which is stored in the register 61, the resulting output of the subtractor 66 being taken as Vp. At the adder 67, the average value Y00AV of the value stored in the register 62 is added to the average value YnAV of the value stored in the register 64, the output of this adder 67 being taken as Vn.

At the divider 68, processing is performed to calculate the compensation constant Vn/Vp or Vp/Vn, based on the output Vp of the subtractor 66 and the output Vn of the adder 67. The average value Y00AV of the value stored in the register 62 is output to the above-noted A/D converter 12 as the zero-level reference voltage Vref-0.

Figure 9:
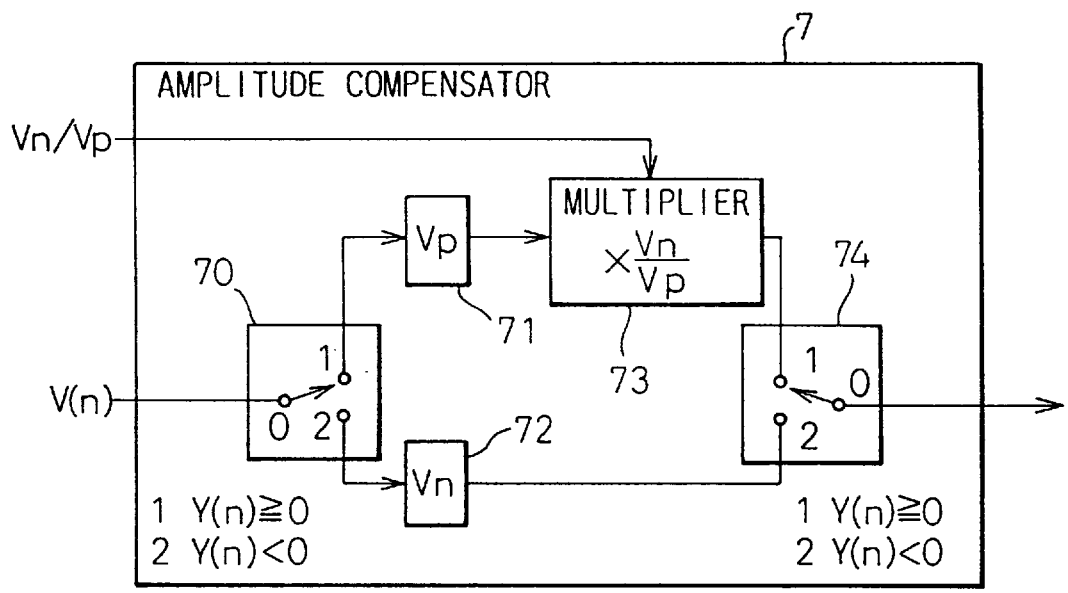
FIG. 9 is a block diagram which shows an example of the configuration of the amplitude compensator of FIG. 5.

FIG. 9 shows an example of the configuration of the amplitude compensator 7 of FIG. 5. This amplitude compensator 7 has a input-side selector 70, registers 71 and 72, a multiplier 73, and an output-side selector 74. The selector 70 connects a contact 0, to which is input the signal Y(n) to either contact 1 or contact 2, in accordance with the polarity of the signal Y(n). When the polarity of the input signal at the point in time n is positive or zero, contact 0 is connected to contact 1, and when it is negative, contact 0 is connected to contact 2. Register 71 is connected to contact 1 and register 72 is connected to contact 2. In this arrangement, the value of Y(n) stored in register 71 is Vp, and the value of Y(n) stored in register 72 is Vn.

The multiplier 73 is connected to the output side of the register 71, and multiplies the signal Vp output from register 71 by the compensation constant Vn/Vp input from the compensation constant generator 6. The output of the multiplier 73 is connected to a contact 1 of the output-side selector 74, the output of the register 72 being connected to the contact 2 of this selector 74. The selector 74 is switched in concert with the selector 70, so that when the input signal Y(n) is positive or zero contact 1 is connected to contact 0, and when the input signal Y(n) is negative contact 2 is connected to contact 0. Therefore, when the input signal Y(n) is either positive or zero, the signal output from the multiplier 73 is output, but when the input signal Y(n) is negative, the signal from the register 72 is output.

As described above, in this embodiment, with respect to an analog signal read by an MR head and which has positive and negative peak values with respect to a reference level which are different, a zero-reference voltage Vref-0 is generated at the compensation constant generator 6, this being output to the A/D converter 12 to set the zero level, and additionally a compensation constant generated by the compensation constant generator 6 is input to the amplitude compensator 7, thereby compensating for the positive and negative peak values. In this manner, in this embodiment, the positive and negative peak difference is detected while considering the DC offset component in the signal path, thereby performing proper compensation therefor, enabling proper waveshaping.

Figure 10:
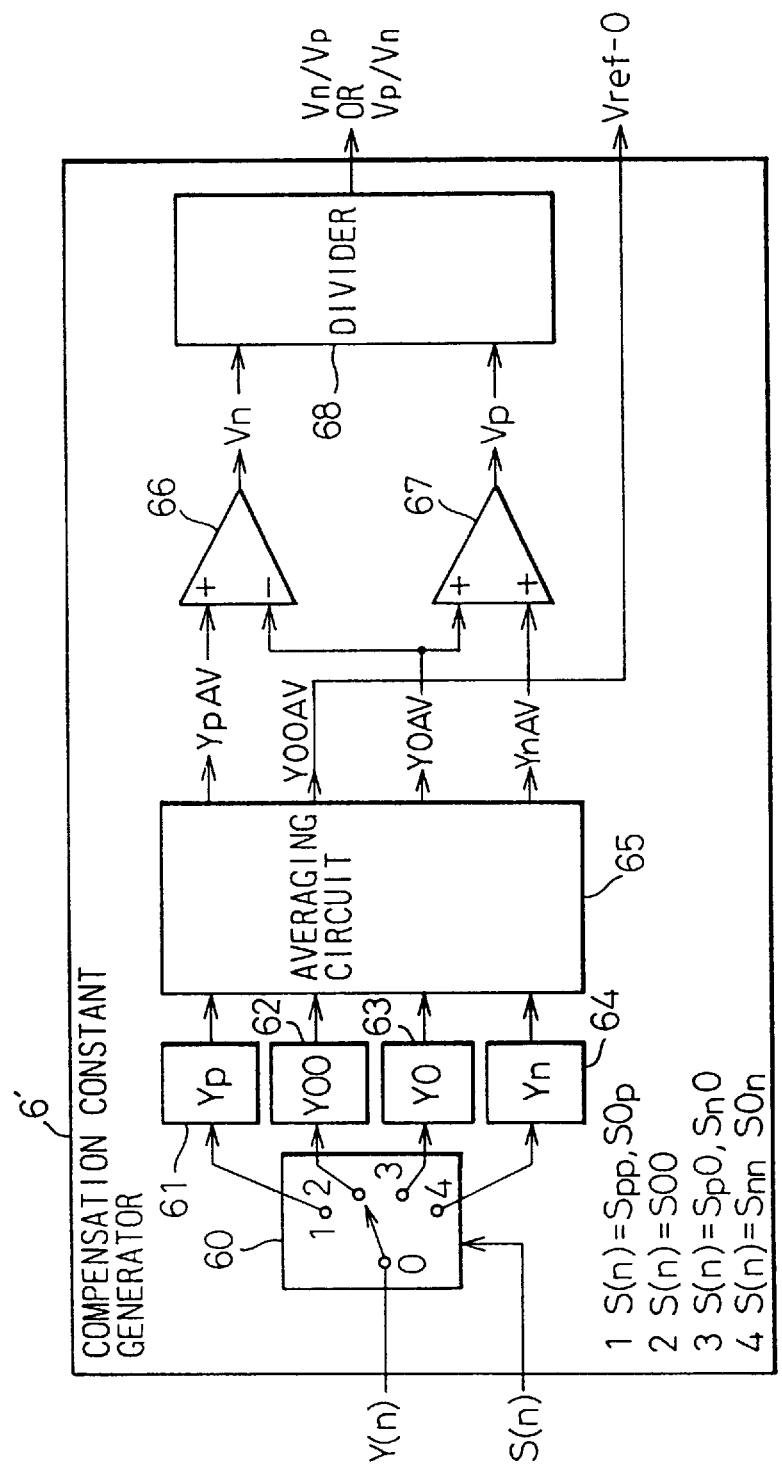
FIG. 10 is a block diagram which shows another example of the constant generator of FIG. 5.

FIG. 10 shows the configuration of the compensation constant generator 6', which is another example of the compensation constant generator 6 of FIG. 5, and in this drawing elements that are the same as elements in the compensation constant generator 6 of FIG. 8 have been assigned the same reference numerals for this description. This constant generator 6' has a selector 60, registers 61, 62, 63, and 64, an averaging circuit 65, a subtractor 66, an adder 67, and a divider 68. The selector 60 connects the contact 0, to which is input the signal Y(n), to one of the contacts 1 through 4, in response to the output signal (interference state) from the interference detector 5. When the interference state S(n) at time n is the above-noted Spp or S0p, contact 0 is connected to contact 1, when S(n)=S00 contact 0 is connected to contact 2, when S(n)=Sp0 or Sn0 contact 0 is connected to contact 3, and when S(n)=Snn or S0n, contact 0 is connected to contact 4. Register 61 is connected to contact 1, register 62 is connected to contact 2, register 63 is connected to contact 3, and register 64 is connected to contact 3. In this arrangement, the value of the signal Y(n) stored in register 61 is Yp, the value of Y(n) stored in register 62 is Y00, the value of Y(n) stored in register 63 is Y0, and the value of Y(n) stored in register 64 is Yn.

At the averaging circuit 65, the values of Yp, Y00, Y0, and Yn which are stored each individually in registers 61, 62, 63, and 64 are averaged each prescribed amount of time, the resulting averaged values being output as YPAV, Y00AV, Y0AV, and YnAV. At the subtractor 66, processing is performed to subtract the average value Y0AV which is stored in the register 63 from the average value YpAV of the value which is stored in the register 61, the resulting output of the subtractor 66 being taken as Vn. At the adder 67, the average value Y0AV of the value stored in the register 63 is added to the average value YnAV of the value stored in the register 64, the output of this adder 67 being taken as Vp.

At the divider 68, processing is performed to calculate the compensation constant Vn/Vp or Vp/Vn, based on the output Vn of the subtractor 66 and the output Vp of the adder 67. The average value Y00AV of the value stored in the register 62 is output to the above-noted A/D converter 12 as the zero-level reference voltage Vref-0.

Figure 11:
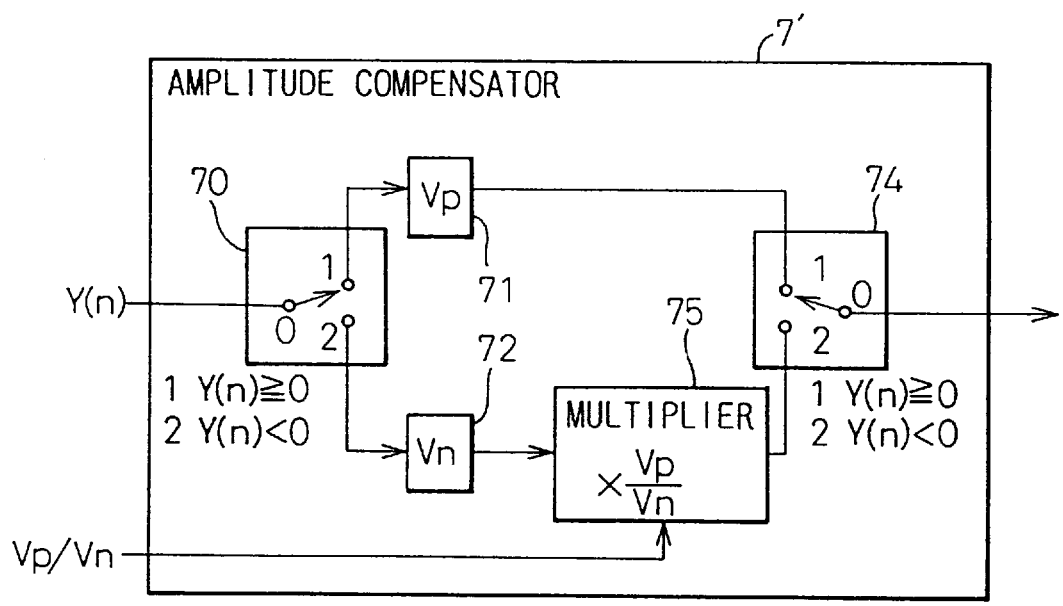
FIG. 11 is a block diagram which shows another example of the configuration of the amplitude compensator of FIG. 5.

FIG. 11 shows the configuration of the amplitude adjuster 7', which is another example of the amplitude adjuster 7 of FIG. 5, and the drawing elements that are the same as elements in the compensation constant generator 6 of FIG. 8 have been assigned the same reference numerals for this description. This amplitude compensator 7' has a input-side selector 70, registers 71 and 72, a multiplier 75, and an output-side selector 74. Because the functions and configuration of the input-side selector 70, registers 71 and 72, and the output-side selector are the same as described with regard to FIG. 9, they will not be explicitly described here, the description being limited to the differences only.

The only difference in the configuration of the amplitude compensator 7' with respect to the amplitude compensator 7 is the position of the multiplier 75. In the amplitude compensator 7, multiplier 73 is provided between the register 71 an the selector 74, with a direct connection between the register 72 and the selector 74. However, in the amplitude compensator 7', there is no multiplier 73, a direct connection being made between the register 71 and the selector 74, and the multiplier 75 is provided instead between the register 72 and the selector 74. The difference, then, between these two arrangements is that, at the multiplier 73, the signal Vp which is output from the register 71 is multiplied by the compensation constant Vn/Vp input from the compensation constant generator 6, whereas at the multiplier 75, the signal Vn output from the register 72 is multiplied by the compensation constant Vp/Vn input from the compensation constant generator 6.

Therefore, in the case of the amplitude compensator 7', when the input signal Y(n) is either positive or zero, the signal from the register 72 is output, but when the input signal Y(n) is negative, the signal output from the multiplier 75 is output.

Figure 12:
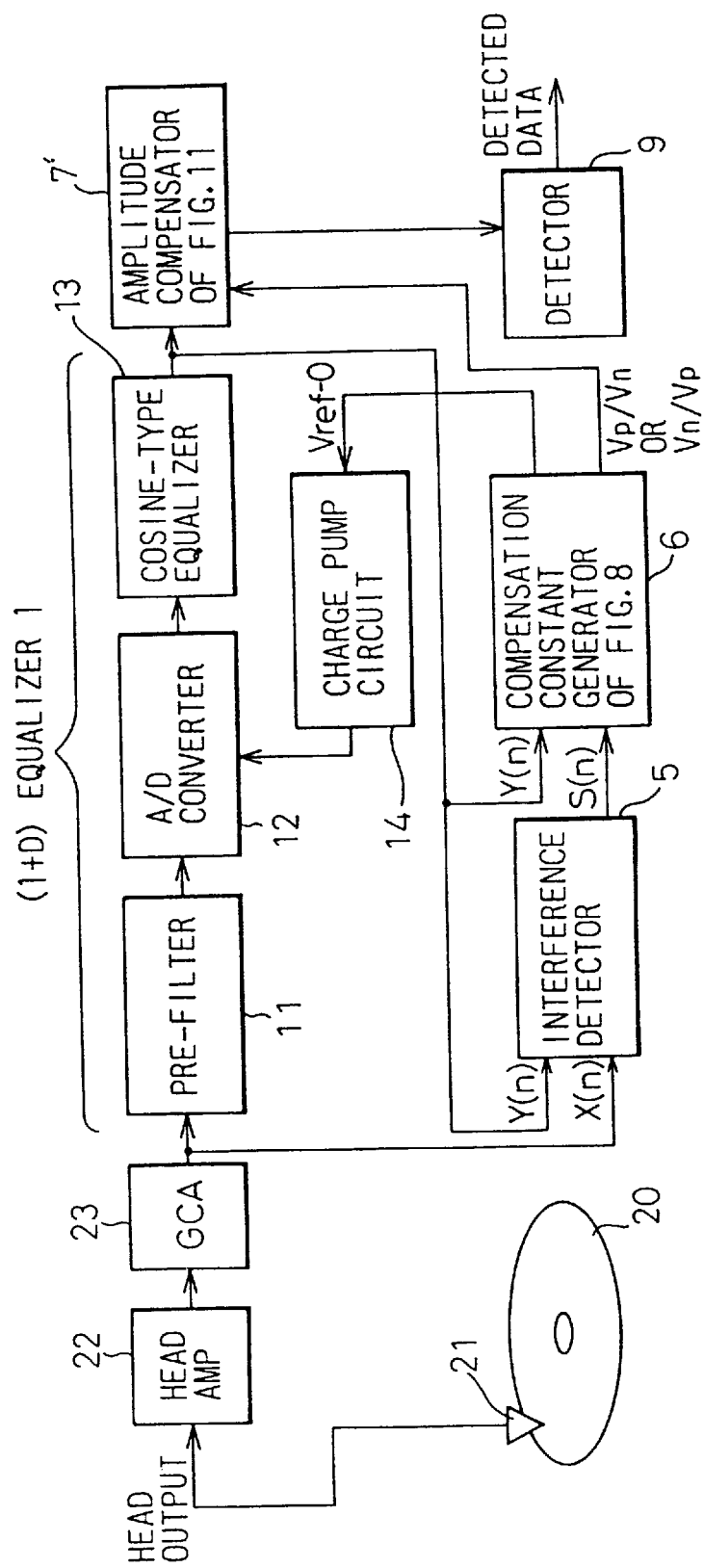
FIG. 12 is a circuit block diagram which shows the configuration of the second embodiment of an analog waveform waveshaping circuit according to the present invention.

FIG. 12 is a circuit block diagram which shows the configuration of the second embodiment of an analog waveshaping circuit according to the present invention, this being a variation of the first embodiment. In the first embodiment, which was described using FIG. 5, the compensation constant generator 6 described using FIG. 8 and the amplitude compensator 7 described using FIG. 10 were used, whereas in this second embodiment, the amplitude compensator 7 of FIG. 5 is replaced by the amplitude compensator 7' which was described using FIG. 11, all other parts of the configuration being the same as the first embodiment. Therefore, common elements have been assigned the same reference numerals as in the first embodiment, and will not be explicitly described herein.

Figure 13:
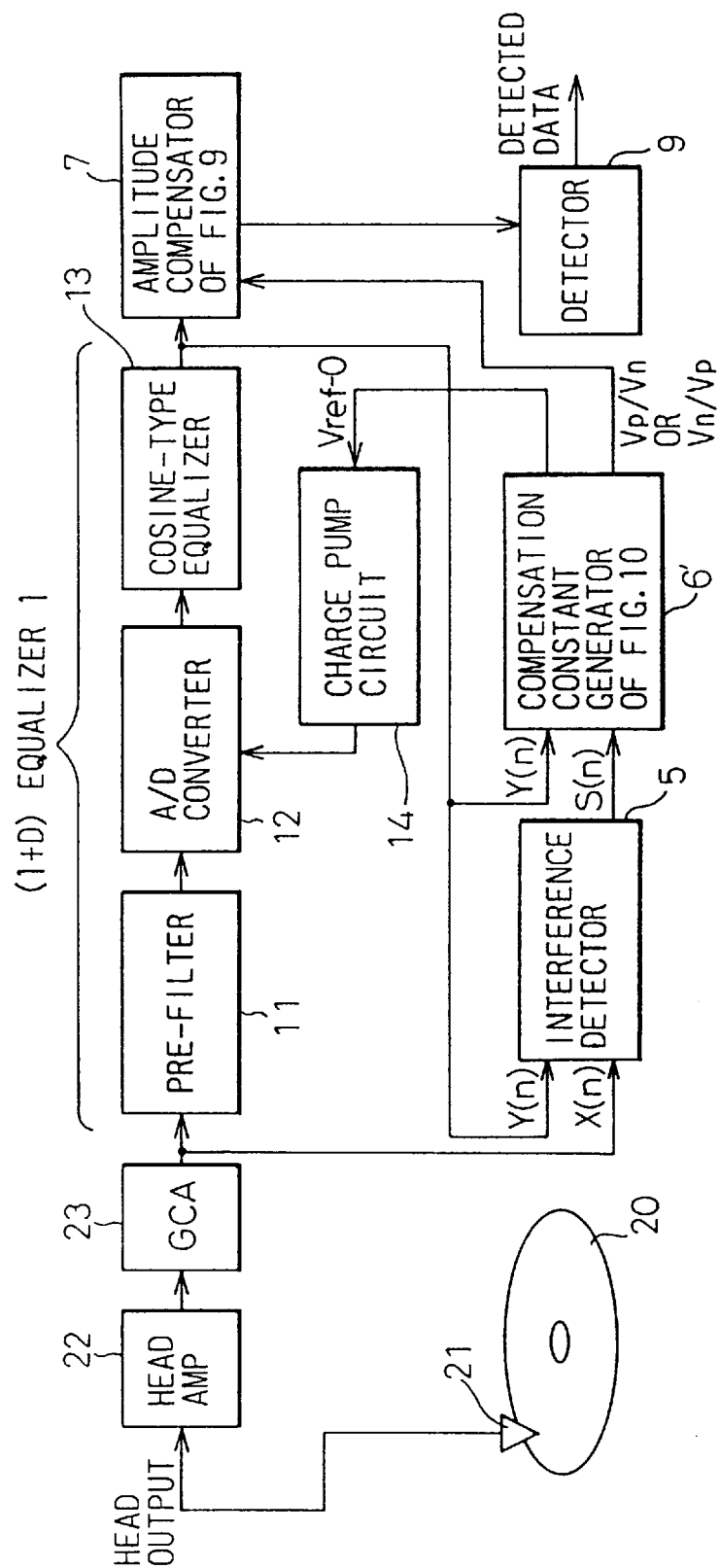
FIG. 13 is a circuit block diagram which shows the configuration of the third embodiment of an analog waveform waveshaping circuit according to the present invention.

FIG. 13 is a circuit block diagram which shows the configuration of the third embodiment of an analog waveshaping circuit according to the present invention, this being a variation of the first embodiment. In the first embodiment, which was described using FIG. 5, the compensation constant generator 6 described using FIG. 8 and the amplitude compensator 7 described using FIG. 10 were used, whereas in this third embodiment, the compensation constant generator 6 of FIG. 5 is replaced by the compensation constant generator 6' which was described using FIG. 10, all other parts of the configuration being the same as the first embodiment. Therefore, common elements have been assigned the same reference numerals as in the first embodiment, and will not be explicitly described herein.

Figure 14:
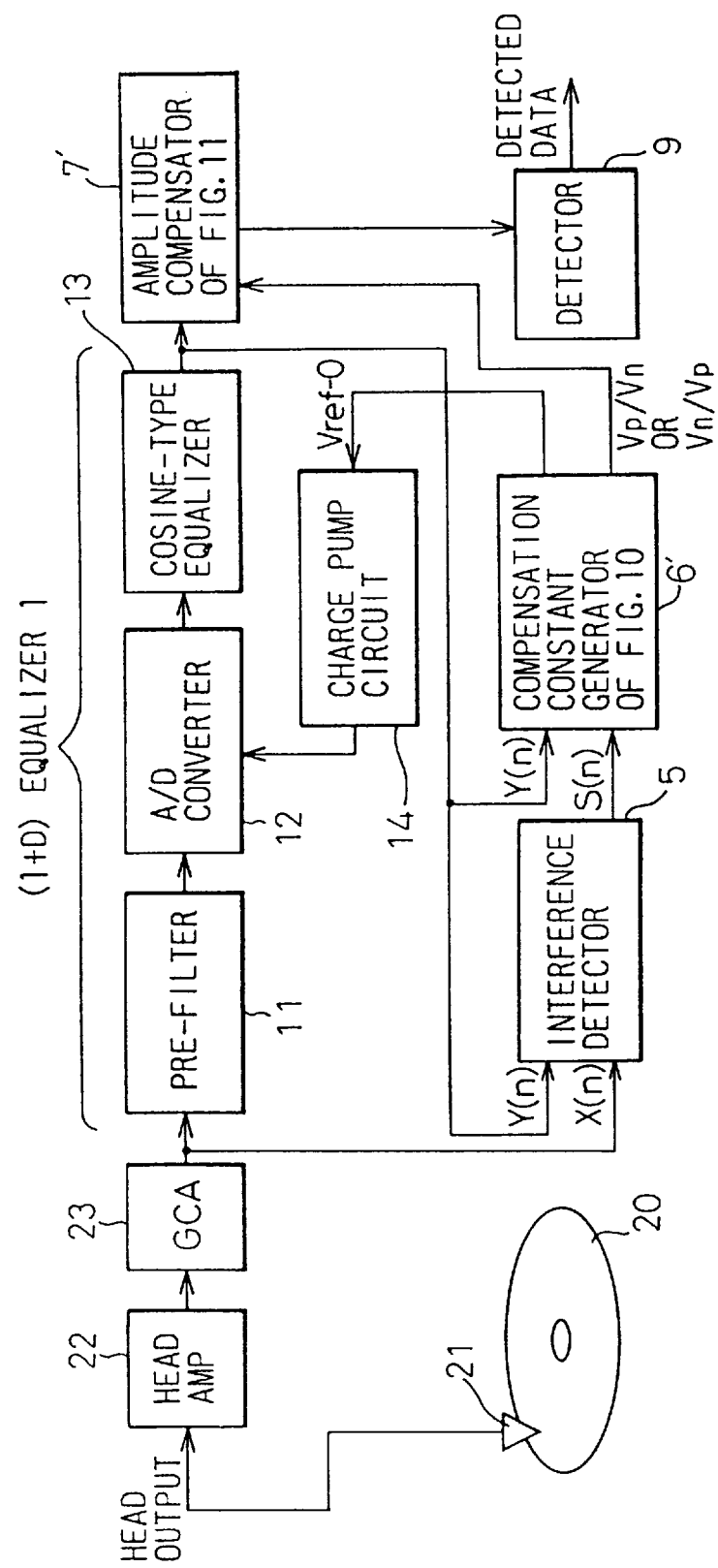
FIG. 14 is a circuit block diagram which shows the configuration of the fourth embodiment of an analog waveform waveshaping circuit according to the present invention.

FIG. 14 is a circuit block diagram which shows the configuration of the fourth embodiment of an analog waveshaping circuit according to the present invention, this being a variation of the first embodiment. In the first embodiment, which was described using FIG. 5, the compensation constant generator 6 described using FIG. 8 and the amplitude compensator 7 described using FIG. 10 were used, whereas in this fourth embodiment, not only is the compensation constant generator 6 of FIG. 5 replaced by the compensation constant generator 6' which was described using FIG. 10, but also the compensation constant generator 6 of FIG. 5 is replaced by the compensation constant generator 6' which was described using FIG. 10, all other parts of the configuration being the same as the first embodiment. Therefore, common elements have been assigned the same reference numerals as in the first embodiment, and will not be explicitly described herein.

Figure 15:
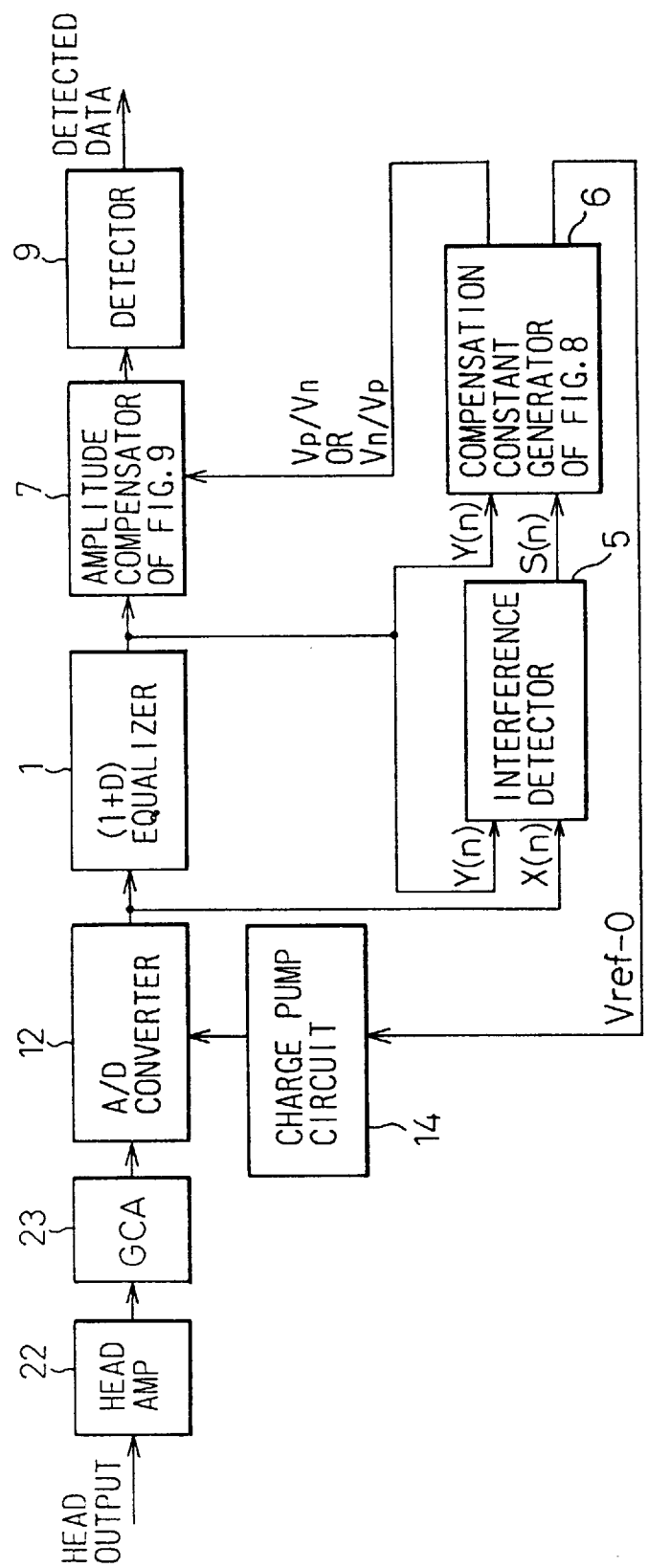
FIG. 15 is a circuit block diagram which shows the configuration of the fifth embodiment of an analog waveform waveshaping circuit according to the present invention.

FIG. 15 is a circuit block diagram which shows the configuration of the fifth embodiment of an analog waveshaping circuit according to the present invention. The fifth embodiment differs from the first embodiment which was described using FIG. 5 in that the A/D converter 12 which was made a part of the equalizer 1 in the first embodiment is placed as the stage previous to the equalizer 1. Additionally, because the A/D converter is placed as the stage previous to the equalizer 1, a charge pump circuit 14 is provided between this A/D converter 12 and the compensation constant generator 6. In this embodiment, the charge pump circuit 14 performs integration operation based on the DC offset level information Vref-0 from the compensation constant generator 6, thereby setting the zero-level reference of the A/D converter 12. Other parts of the configuration are the same as the first embodiment described using FIG. 5. Therefore, common elements have been assigned the same reference numerals as in the first embodiment, and will not be explicitly described herein.

Figure 16:
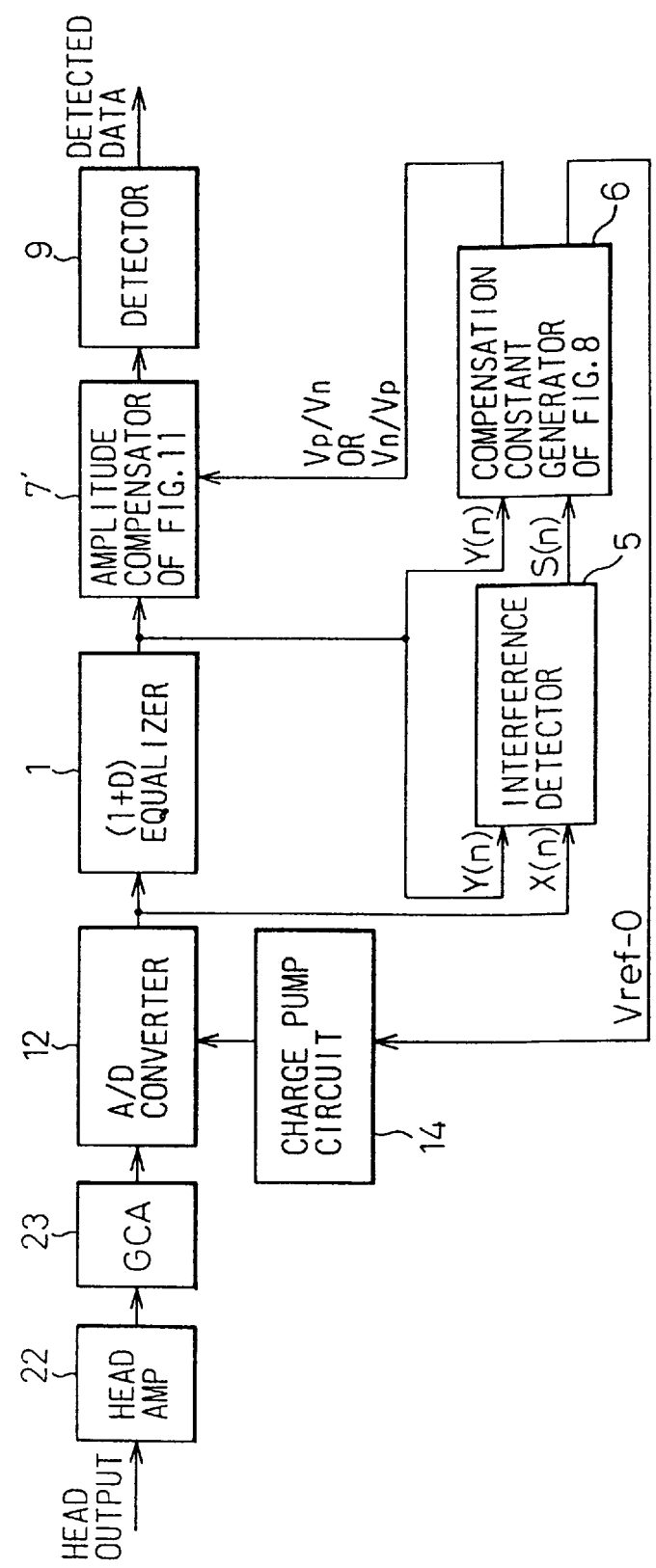
FIG. 16 is a circuit block diagram which shows the configuration of the sixth embodiment of an analog waveform waveshaping circuit according to the present invention.

FIG. 16 is a circuit block diagram which shows the configuration of the sixth embodiment of an analog waveshaping circuit according to the present invention, this being a variation of the fifth embodiment. In the fifth embodiment, which was described using FIG. 15, the compensation constant generator 6 described using FIG. 8 and the amplitude compensator 7 described using FIG. 10 were used, whereas in this sixth embodiment the amplitude compensator 7 of FIG. 15 is replaced by the amplitude compensator 7' which was described using FIG. 11, all other parts of the configuration being the same as the fifth embodiment. Therefore, common elements have been assigned the same reference numerals as in the first embodiment, and will not be explicitly described herein.

Figure 17:
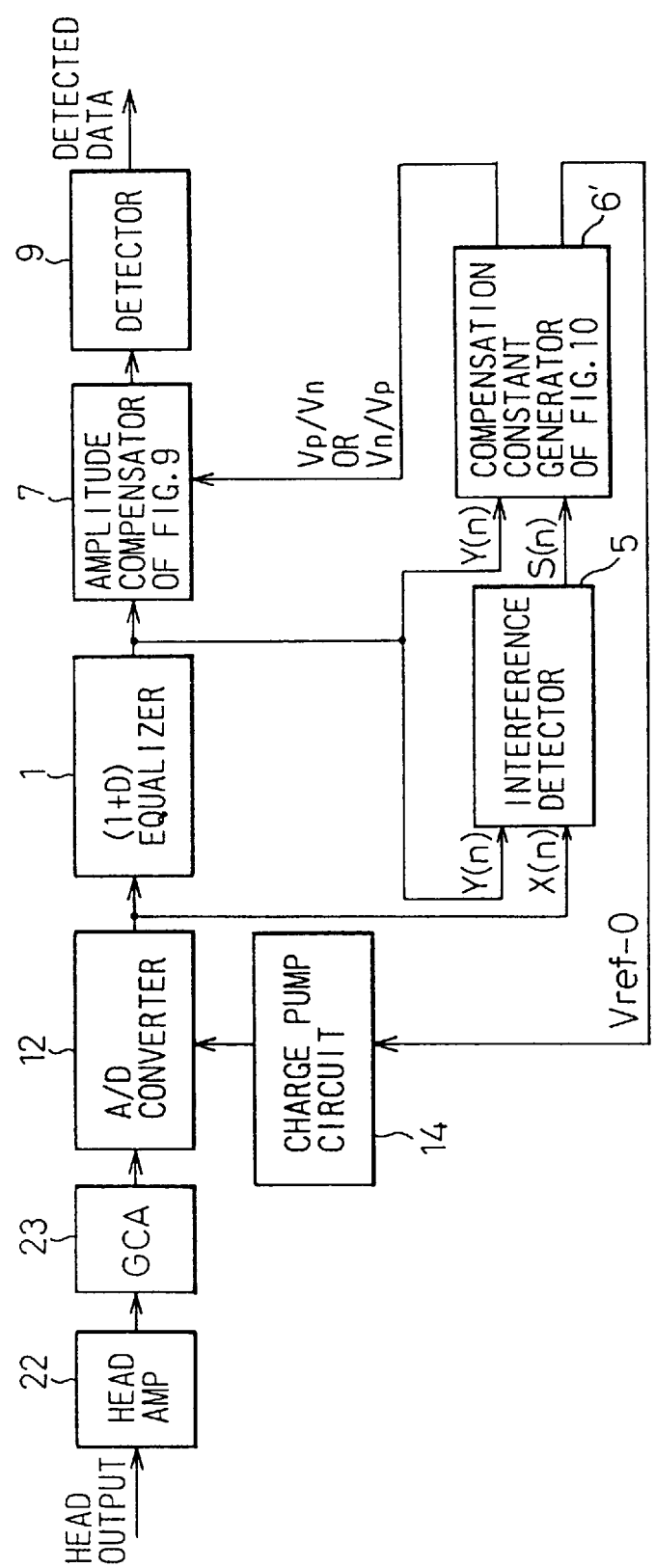
FIG. 17 is a circuit block diagram which shows the configuration of the seventh embodiment of an analog waveform waveshaping circuit according to the present invention.

FIG. 17 is a circuit block diagram which shows the configuration of the seventh embodiment of an analog waveshaping circuit according to the present invention, this being a variation of the fifth embodiment. In the fifth embodiment, which was described using FIG. 15, the compensation constant generator 6 described using FIG. 8 and the amplitude compensator 7 described using FIG. 10 were used, whereas in this seventh embodiment the compensation constant generator 6 of FIG. 15 is replaced by the compensation constant generator 6' which was described using FIG. 10, all other parts of the configuration being the same as the fifth embodiment. Therefore, common elements have been assigned the same reference numerals as in the first embodiment, and will not be explicitly described herein.

Figure 18:
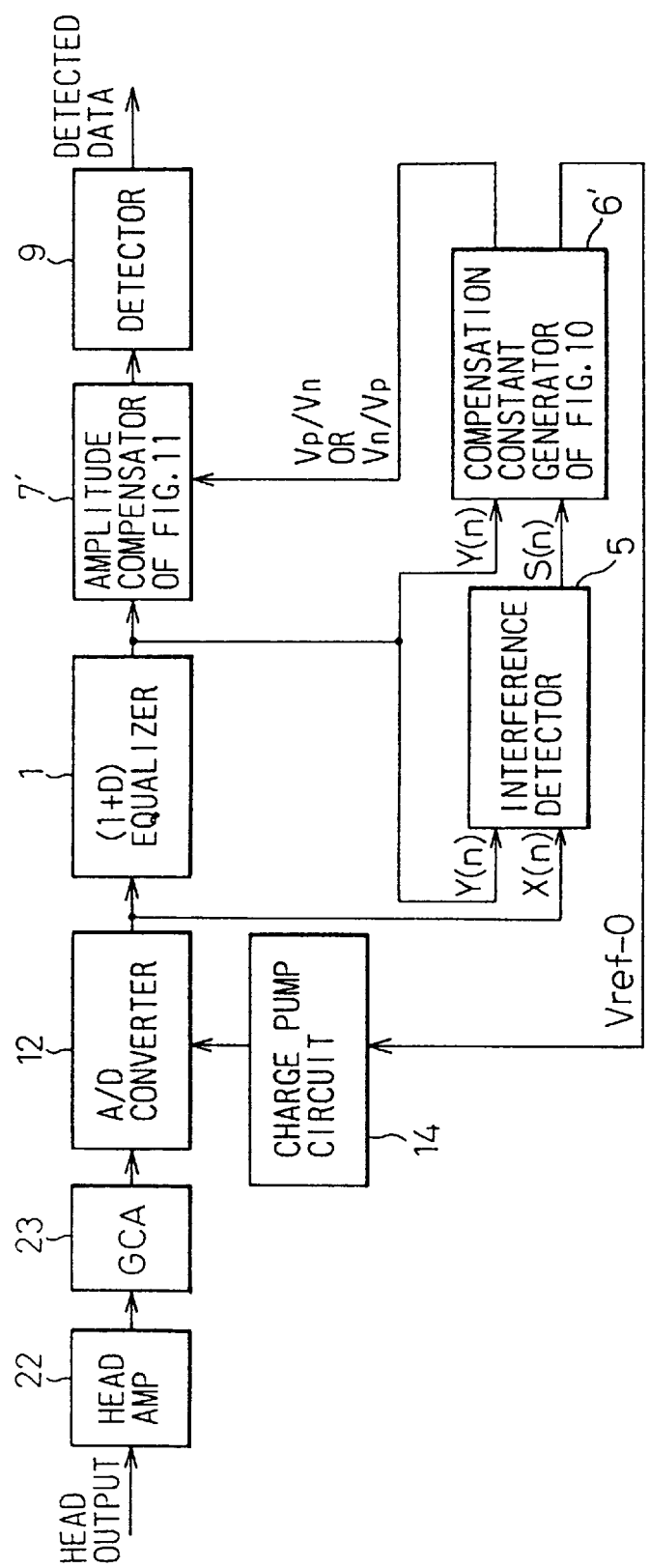
FIG. 18 is a circuit block diagram which shows the configuration of the eight embodiment of an analog waveform waveshaping circuit according to the present invention.

FIG. 18 is a circuit block diagram which shows the configuration of the eight embodiment of an analog waveshaping circuit according to the present invention, this being a variation of the fifth embodiment. In the fifth embodiment, which was described using FIG. 15, the compensation constant generator 6 described using FIG. 8 and the amplitude compensator 7 described using FIG. 10 were used, whereas in this seventh embodiment not only is the compensation constant generator 6 of FIG. 15 replaced by the compensation constant generator 6' which was described using FIG. 10, but also the amplitude compensator 7 of FIG. 15 is replaced by the amplitude compensator 7' which was described using FIG. 11, other parts of the configuration being the same as the fifth embodiment. Therefore, common elements have been assigned the same reference numerals as in the first embodiment, and will not be explicitly described hereinafter, other parts of the configuration being the same as the first embodiment.

Figure 19:
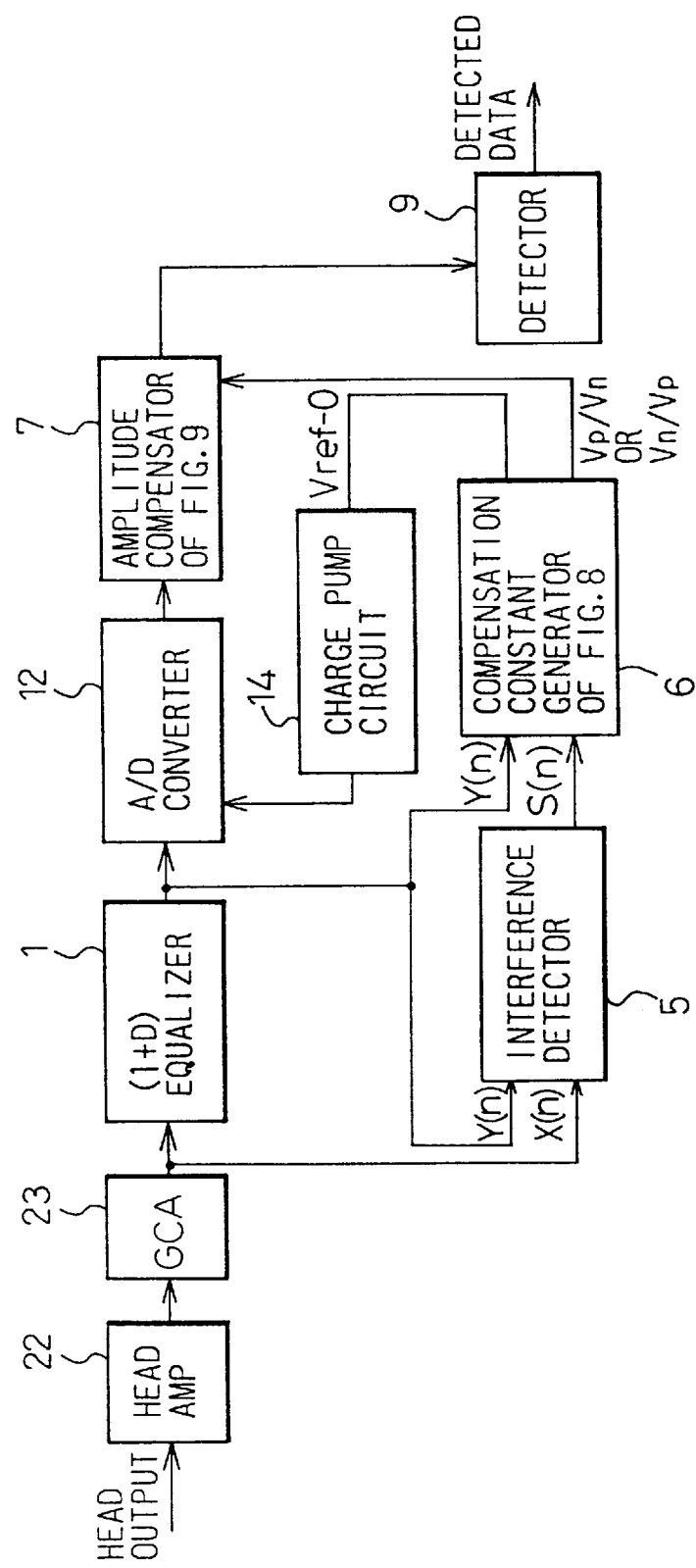
FIG. 19 is a circuit block diagram which shows the configuration of the ninth embodiment of an analog waveform waveshaping circuit according to the present invention.

FIG. 19 is a circuit block diagram which shows the configuration of the ninth embodiment of an analog waveshaping circuit according to the present invention. The fifth embodiment differs from the first embodiment which was described using FIG. 5 in that the A/D converter 12 which was made a part of the equalizer 1 in the first embodiment is placed as the stage following the equalizer 1. Additionally, although the A/D converter is placed as the stage following the equalizer 1, the DC offset level information Vref-0 from the compensation constant generator 6 is input directly to the A/D converter 12 via the charge pump circuit 14. In this embodiment, the A/D converter 12 zero-level reference is also set based on the DC offset level information Vref-0 from the compensation constant generator 6. Other parts of the configuration are the same as described with regard to FIG. 5. Therefore, common elements have been assigned the same reference numerals as in FIG. 5, and will not be explicitly described herein.

Figure 20:
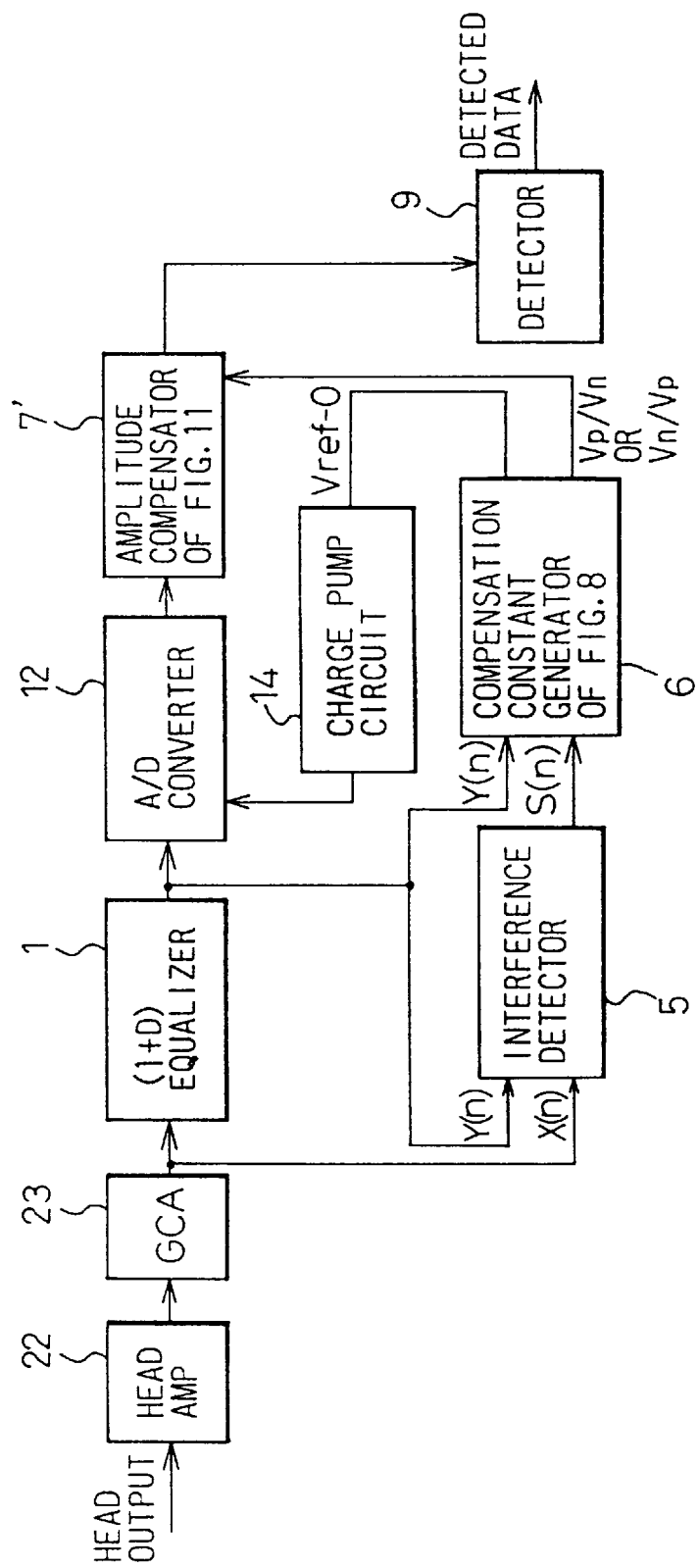
FIG. 20 is a circuit block diagram which shows the configuration of the tenth embodiment of an analog waveform waveshaping circuit according to the present invention.

FIG. 20 is a circuit block diagram which shows the configuration of the tenth embodiment of an analog waveshaping circuit according to the present invention, this being a variation of the ninth embodiment. In the ninth embodiment, which was described using FIG. 19, the compensation constant generator 6 described using FIG. 8 and the amplitude compensator 7 described using FIG. 10 were used, whereas in this tenth embodiment the amplitude compensator 7 of FIG. 19 is replaced by the amplitude compensator 7' which was described using FIG. 11, all other parts of the configuration being the same as the ninth embodiment. Therefore, common elements have been assigned the same reference numerals, and will not be explicitly described herein.

Figure 21:
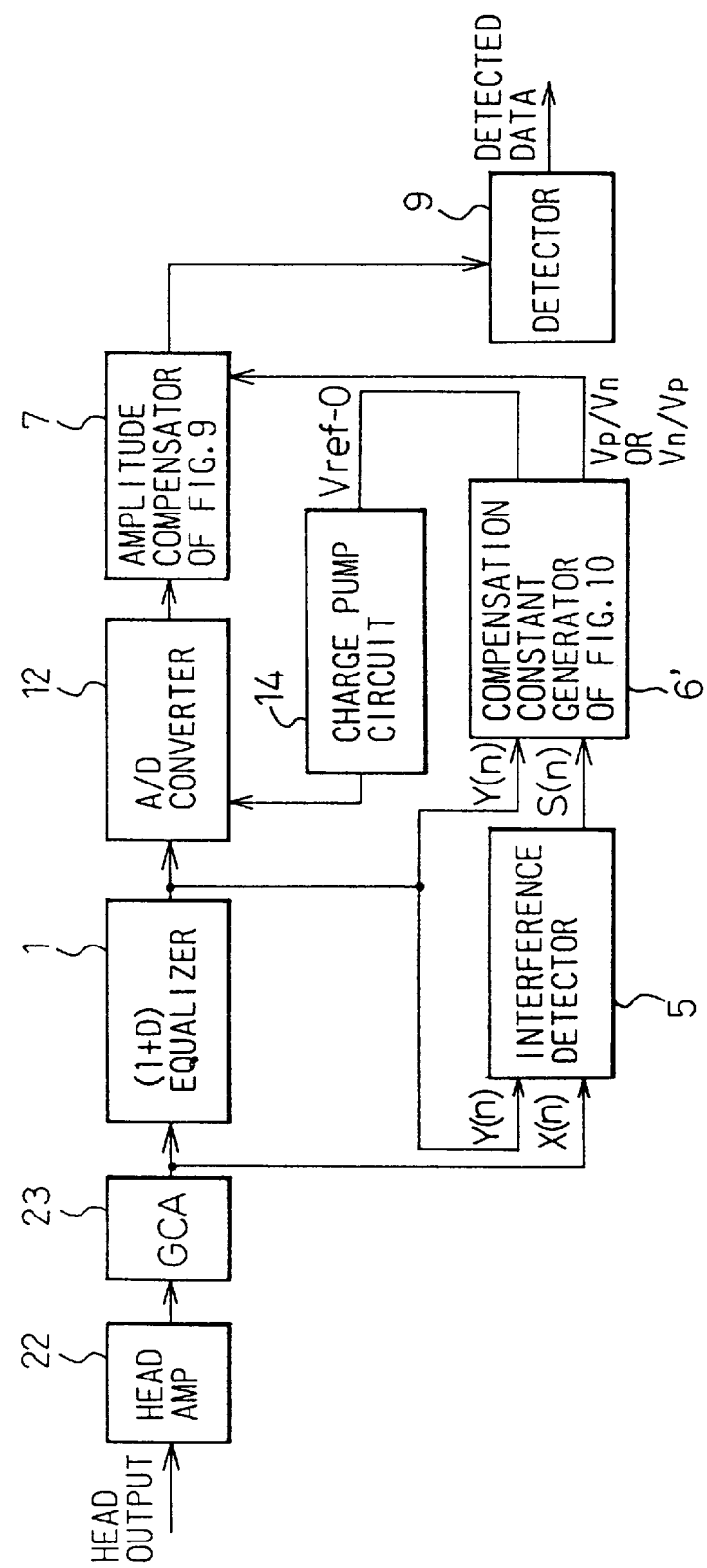
FIG. 21 is a circuit block diagram which shows the configuration of the eleventh embodiment of an analog waveform waveshaping circuit according to the present invention.

FIG. 21 is a circuit block diagram which shows the configuration of the eleventh embodiment of an analog waveshaping circuit according to the present invention, this being a variation of the ninth embodiment. In the ninth embodiment, which was described using FIG. 19, the compensation constant generator 6 described using FIG. 8 and the amplitude compensator 7 described using FIG. 10 were used, whereas in this eleventh embodiment the compensation constant generator 6 of FIG. 19 is replaced by the compensation constant generator 6' which was described using FIG. 10, all other parts of the configuration being the same as the fifth embodiment. Therefore, common elements have been assigned the same reference numerals, and will not be explicitly described herein.

Figure 22:
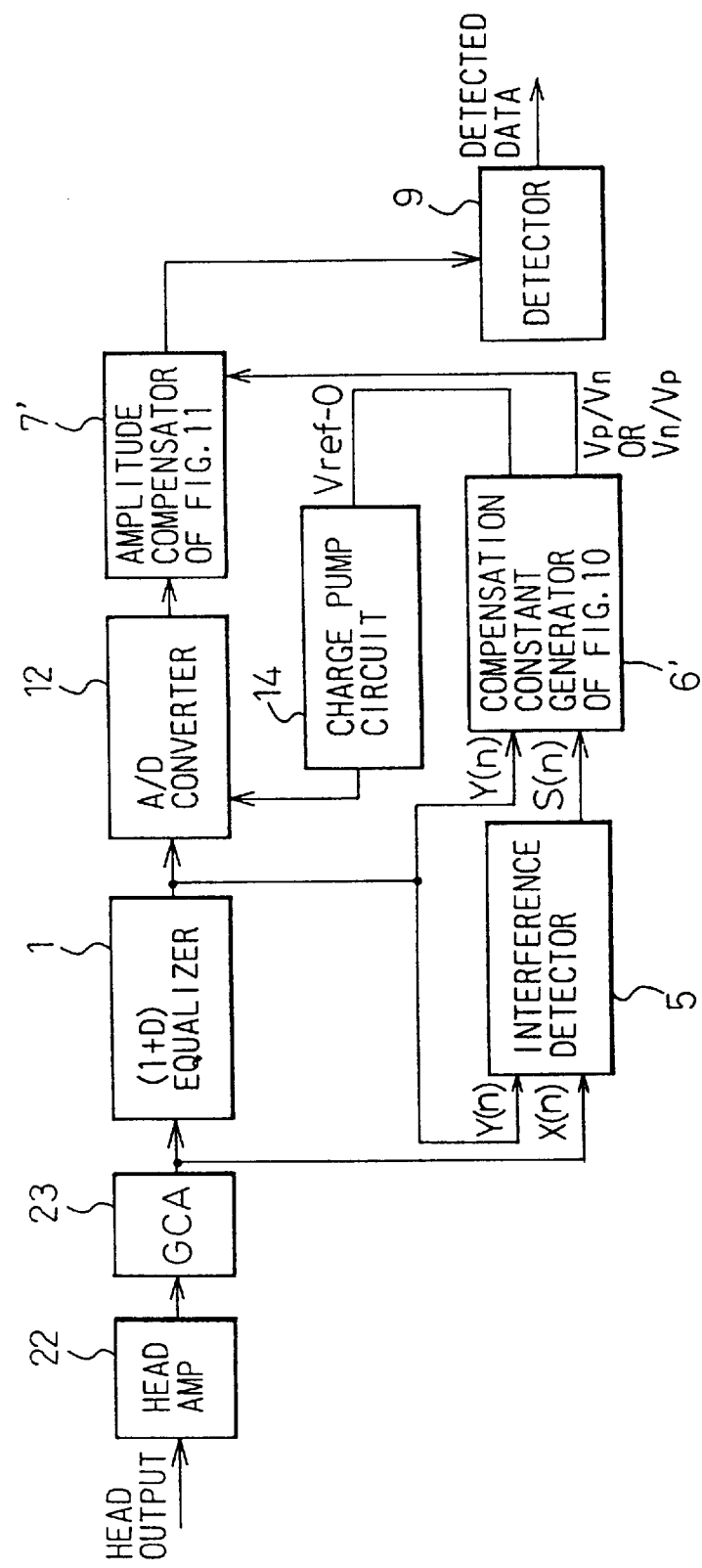
FIG. 22 is a circuit block diagram which shows the configuration of the twelfth embodiment of an analog waveform waveshaping circuit according to the present invention.

FIG. 22 is a circuit block diagram which shows the configuration of the twelfth embodiment of an analog waveshaping circuit according to the present invention, this being a variation of the ninth embodiment. In the ninth embodiment, which was described using FIG. 19, the compensation constant generator 6 described using FIG. 8 and the amplitude compensator 7 described using FIG. 10 were used, whereas in this twelfth embodiment not only is the compensation constant generator 6 of FIG. 19 replaced by the compensation constant generator 6' which was described using FIG. 10, but also the amplitude compensator 7 of FIG. 19 is replaced by the amplitude compensator 7' which was described using FIG. 11, all other parts of the configuration being the same as the ninth embodiment. Therefore, common elements have been assigned the same reference numerals, and will not be explicitly described herein.

Figure 23:
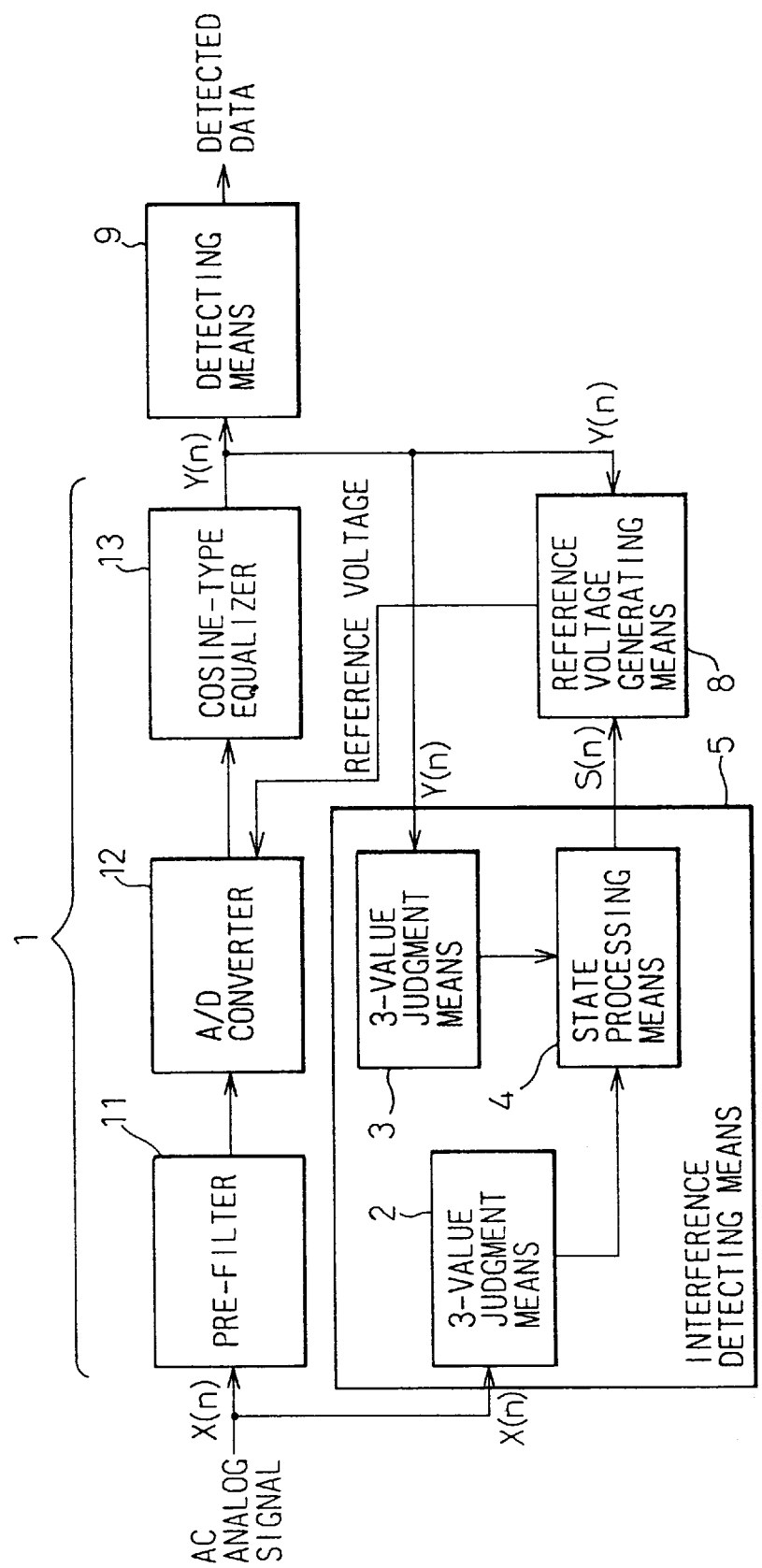
FIG. 23 is a block diagram which shows the basic configuration of the second aspect of an analog signal waveshaping circuit according to the present invention.

FIG. 23 shows a configuration which illustrates the principle of the second aspect of an analog signal waveshaping circuit according to the present invention. As shown in FIG. 23, in the second aspect of an analog signal waveshaping circuit according to the present invention, waveshaping is performed by detecting and compensating the difference between the positive and negative peaks, with respect to the proper reference level of the input signal, while considering the DC offset component of the reference level. The second aspect of the analog waveshaping circuit is formed by a (1+D) equalizing means 1 which is formed by an analog pre-filter 11, an A/D converter 12, and a cosine-type equalizer 13, an interference detecting means 5 which is formed by 3-value judging means 2 and 3 and a state processor 4, a reference voltage generating means 8, and a detecting means 9.

The A/D converter 12 performs an A/D conversion of the output from the analog pre-filter 11, and the cosine-type equalizer 13 digitally performs cosine equalization of the output of the A/D converter 12. The equalizer 1, which is formed by the analog pre-filter 11, the A/D converter 12, and the cosine-type equalizer 13 performs (1+D) equalization of the input signal, with a delay expressed as D. If at the point in time n the input and output signals of the equalizing means 1 are X(n) and Y(n), respectively, and the interference state from the signal X(n) to the signal Y(n) is S(n), the 3-value judging means 2 performs a 3-value judgment of the signal X(n) with a threshold value of V'th. The 3-value judging means 3 performs a 3-value judgment of the signal Y(n) with a threshold value of Vth. The state processing means 4 calculates which of the 7 states Spp, S0p, Sp0, S00, Sn0, S0n, and Snn which can occur from the three values S'p, S'0, and S'n that the signal X(n) can take to the three values Sp, S0, and Sn that the signal Y(n) can take, has occurred, this being output as the interference state S(n). The reference voltage generating means 8 classifies the signal Y(n) into at least three classes, based on the interference state S(n), which is detected by the interference detecting means 5, which has 3-value judging means 2 and 3, and state processing means 4, and stores these, performing processing of the stored values after averaging processing of the stored values, after which the reference voltage is generated. The reference voltage generated by the reference voltage generating means 8 sets the reference of the A/D converter 12. The detecting means 9 performs detection of data from the output of the equalizing means 1.

Embodiments of this second aspect of an analog waveshaping circuit will be described using the drawings FIG. 24 through FIG. 27.

Figure 24:
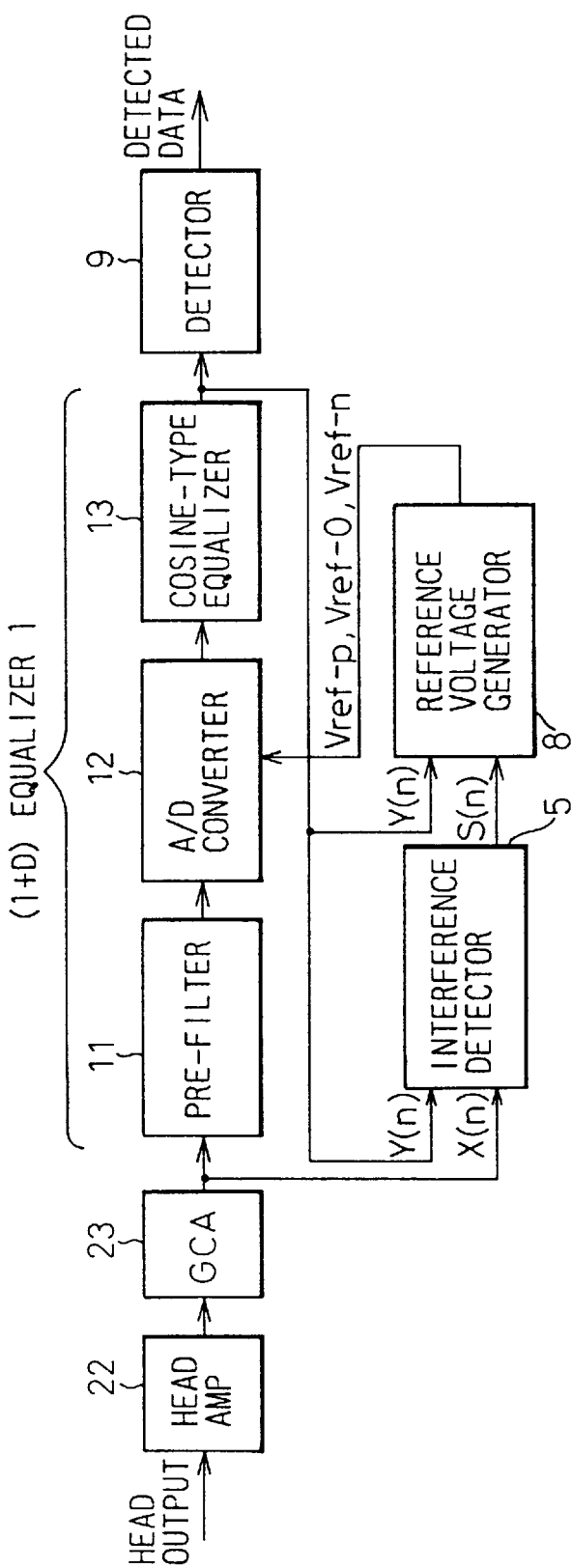
FIG. 24 is a circuit block diagram which shows the configuration of the thirteenth embodiment of an analog waveform waveshaping circuit according to the present invention.

FIG. 24 is a circuit block diagram which shows the configuration of the thirteenth embodiment of an analog waveshaping circuit according to the present invention. In the thirteen embodiment, the head output which is read by an MR head from a magnetic disk (not shown in the drawing) is amplified by a head amplifier 22, and passed through a gain controlled amplifier (GCA) 23, after which it is input to an equalizer 1, which has (1+D) characteristics. The equalizer 1 is formed by an analog pre-filter 11, an A/D converter 12 which performs A/D conversion of the output from the analog pre-filter 11, and a cosine-type equalizer 13 which digitally performs cosine equalization of the output from the A/D converter 12. The output of the cosine-type equalizer 13 is input to a detector 9, at which data is detected.

The output signal X(n) of the GCA 23 and the output signal Y(n) of the cosine-type equalizer 13 are each input to an interference detector 5. The interference detector 5 performs a judgment of interference based on the signal states of the signal X(n) input to the analog pre-filter 11 and the signal Y(n) output from the cosine-type equalizer 13, this interference being output as the signal S(n). In this embodiment, this signal S(n) is input to a reference voltage generator 8.

The reference voltage generator 8 classifies the signal Y(n) into three classes, based on the interference state S(n) which is detected by the interference detection means 5, and after averaging the stored values, generates the reference voltages Vref-p, Vref-0, and Vref-n. These reference voltages Vref-p, Vref-0, and Vref-n are input to the A/D converter 12, thereby setting the reference of this A/D converter 12.

In this manner, in place of the compensation constant generator 6 or 6' and amplitude compensator 7 or 7' of embodiments 1 through 12, in the thirteenth embodiment the reference of the A/D converter 12 is set by the reference voltage generator 8.

Figure 25:
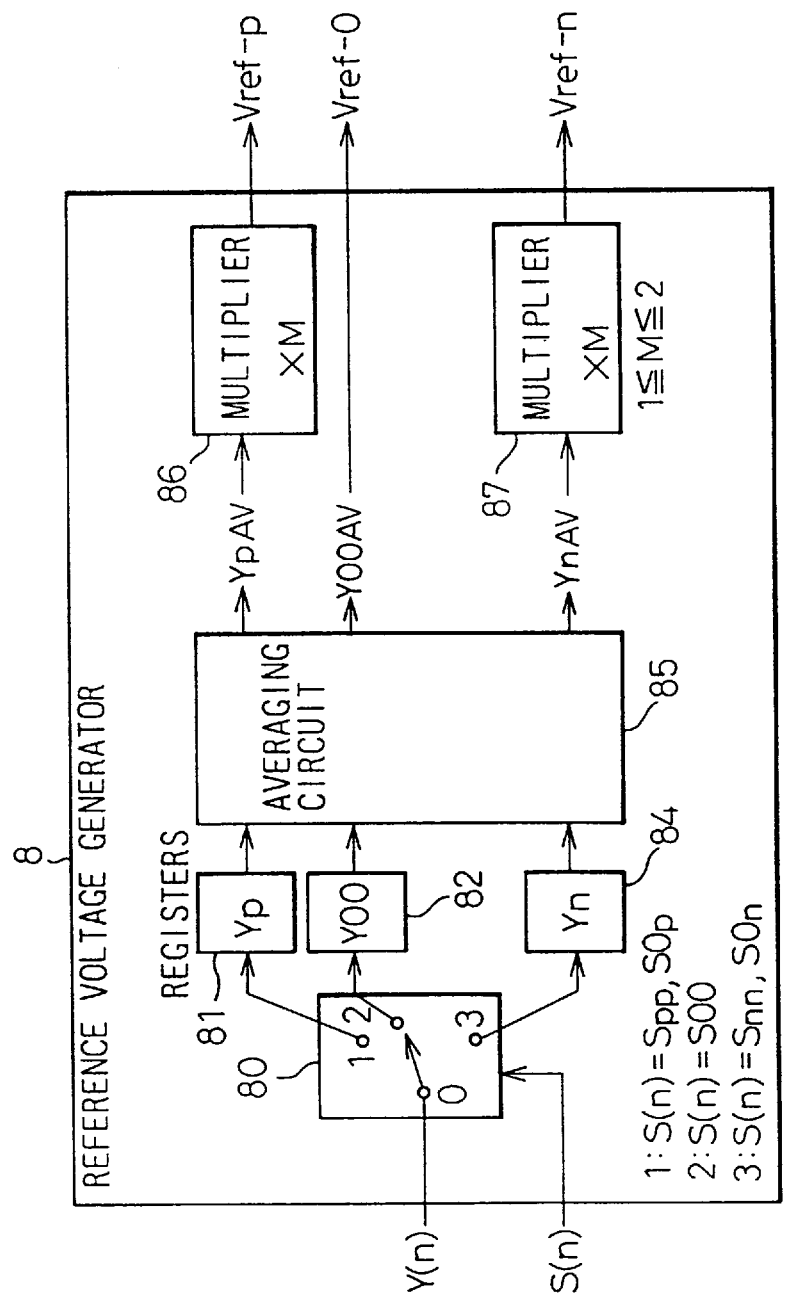
FIG. 25 is a block diagram which shows an example of the configuration of the reference voltage generator of FIG. 24.

FIG. 25 shows an example of the configuration of the reference voltage generator of FIG. 24. This reference voltage generator 8 has a selector 80, registers 81, 82, and 84, an averaging circuit 85, and multipliers 86 and 87. Selector 80 connects a contact 0 to one of contacts 1 through 3, according to the output signal (interference state) S(n) from the interference detector 5. At the point in time n, if the interference state S(n) is the abovedescribed Spp or S0p, contact 0 is connected to contact 1, if S(n)=S00 contact 0 is connected to contact 2, and if S(n)=Snn or S0n, contact 0 is connected to contact 3. Register 81 is connected to contact 1, register 82 is connected to contact 2, and register 84 is connected to contact 3. In this arrangement, the value of Y(n) stored in register 81 is taken as Yp, the value of Y(n) stored in register 82 is taken as Y00, and the value of Y(n) stored in register 84 is taken as Yn.

At the averaging circuit 85, the values of Yp, Y00, and Yn which are stored each individually in registers 81, 82, and 84 are averaged each prescribed amount of time, the resulting averaged values being output as YPAV, Y00AV, and YNAV. At the multiplier 86, processing is performed to multiply the average value YPAV of values stored in the register 81 by a constant M, the result of this multiplication being output as the reference voltage Vref-p. The average value Y00AV of values stored in the register 82 is output without change as the reference voltage Vref-0. At the multiplier 87, processing is performed to multiply the average value YNAV of values stored in the register 84 by the constant M, the result of this multiplication being output as the reference voltage Vref-n. The reference voltages Vref-p, Vref-0, and Vref-n are, as shown in FIG. 7, input to the A/D converter 12, which has a level-determining circuit 123 such as described in relation to FIG. 5.

Figure 26:
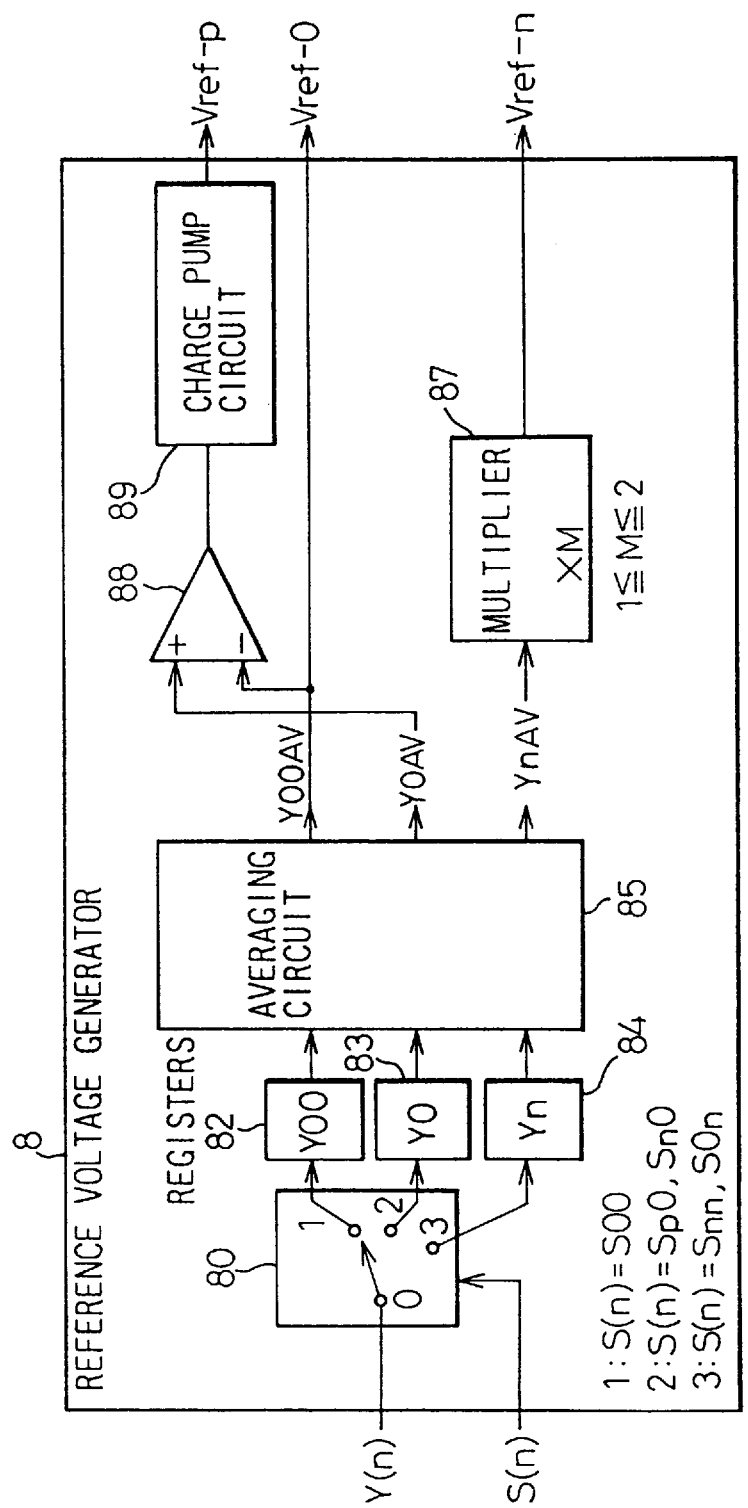
FIG. 26 is a block diagram which shows another example of the configuration of the reference voltage generator of FIG. 24.

FIG. 26 shows the configuration of a reference voltage generator 8', which is another configuration of the reference voltage generator 8 of FIG. 24. In this drawing, elements the same as in the reference voltage generator 8 of FIG. 24 have been assigned the same reference numerals and will not be explicitly described herein. The reference voltage generator 8' has a selector 80, registers 82, 83, and 84, an averaging circuit 85, a multiplier 82, 83, a subtractor 88, and a charge pump circuit 89. Selector 80 connects a contact 0 to one of contacts 1 through 3, according to the output signal (interference state) S(n) from the interference detector 5. At the point in time n, if the interference state S(n) is S00, contact 0 is connected to contact 1, if S(n)=Sp0 or Sn0 contact 0 is connected to contact 2, and if S(n)=Snn or S0n, contact 0 is connected to contact 3. Register 82 is connected to contact 1, register 83 is connected to contact 2, and register 84 is connected to contact 3. In this arrangement, the value of Y(n) stored in register 82 is taken as Y00, the value of Y(n) stored in register 82 is taken as Y0, and the value of Y(n) stored in register 84 is taken as Yn.

At the averaging circuit 85, the values of Y00, Y0 and Yn which are stored individually in register 82, 83, and 84 are averaged each prescribed amount of time, the resulting averaged values being output as Y00AV, Y0AV, and YNAV. At the subtractor 88, processing is performed to subtract the average Y00AV of values stored in the register 82 from the average Y0AV of values stored in the register 83. The output Y0AV−Y00AV from the subtractor 88 is input to the charge pump circuit 89, at which it is integrated, the resulting output being output from the reference voltage generator 8' as the positive-side reference voltage Vref-p. The average Y00AV of the values stored in register 82 is output without change from the reference voltage generator 8' as the zero-level reference voltage Vref-0, and the average YnAV of values stored in the register 84 is input to the multiplier 87, where it is multiplied by a constant M ($1 \leq M \leq 2$), the result being output from the voltage generator 8' as the negative-side reference voltage Vref-n. The reference voltages Vref-p, Vref-0, and Vref-n are, as shown in FIG. 24, input to the A/D converter 12, which has a level-determining circuit 123 such as described in relation to FIG. 5.

Figure 27:
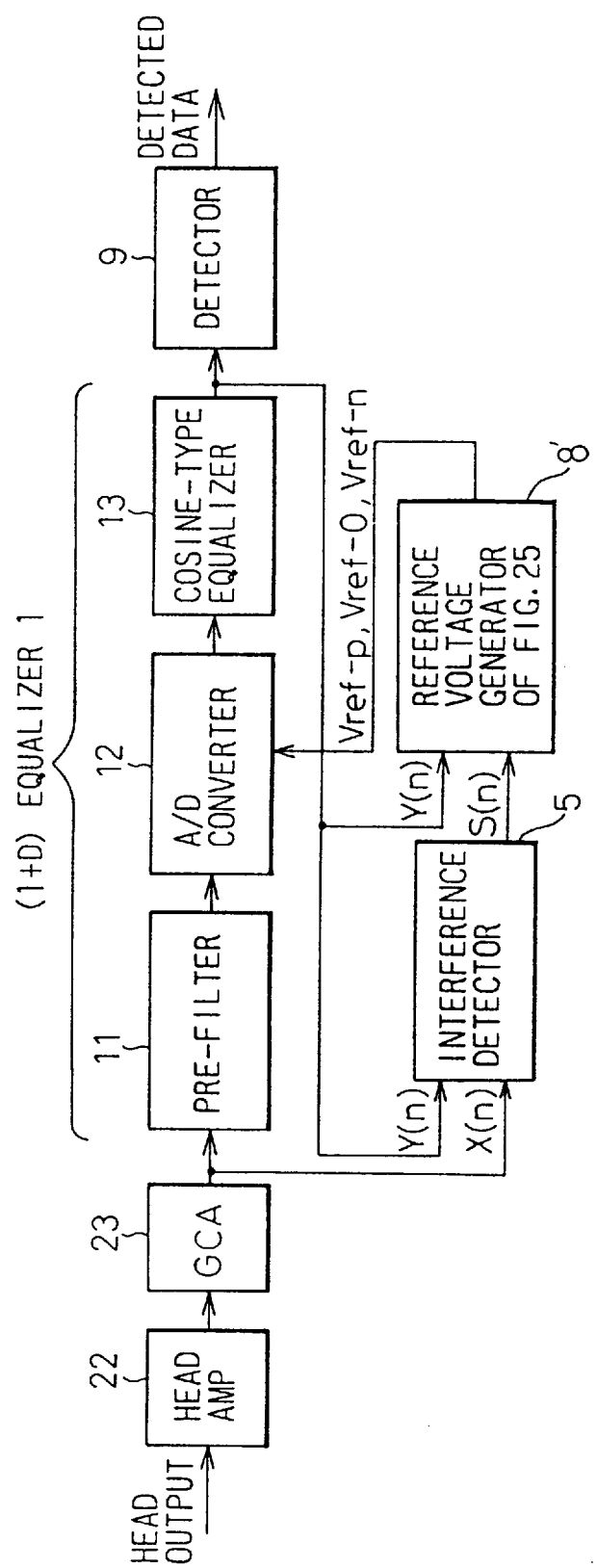
FIG. 27 is a circuit block diagram which shows the configuration of the fourteenth embodiment of an analog waveform waveshaping circuit according to the present invention.

FIG. 27 shows the configuration of the fourteenth embodiment of an analog waveshaping circuit according to the present invention, this being a variation of the thirteenth embodiment. In the thirteenth embodiment described using FIG. 4, the reference voltage generator 8 described using FIG. 25 was used. In this fourteenth embodiment, however, the reference voltage generator 8 described using FIG. 25 is replaced by the reference voltage generator 8' described using FIG. 26, this being the only difference. Therefore common elements have been assigned the same reference numerals and will not be explicitly described herein.

Figure 28:
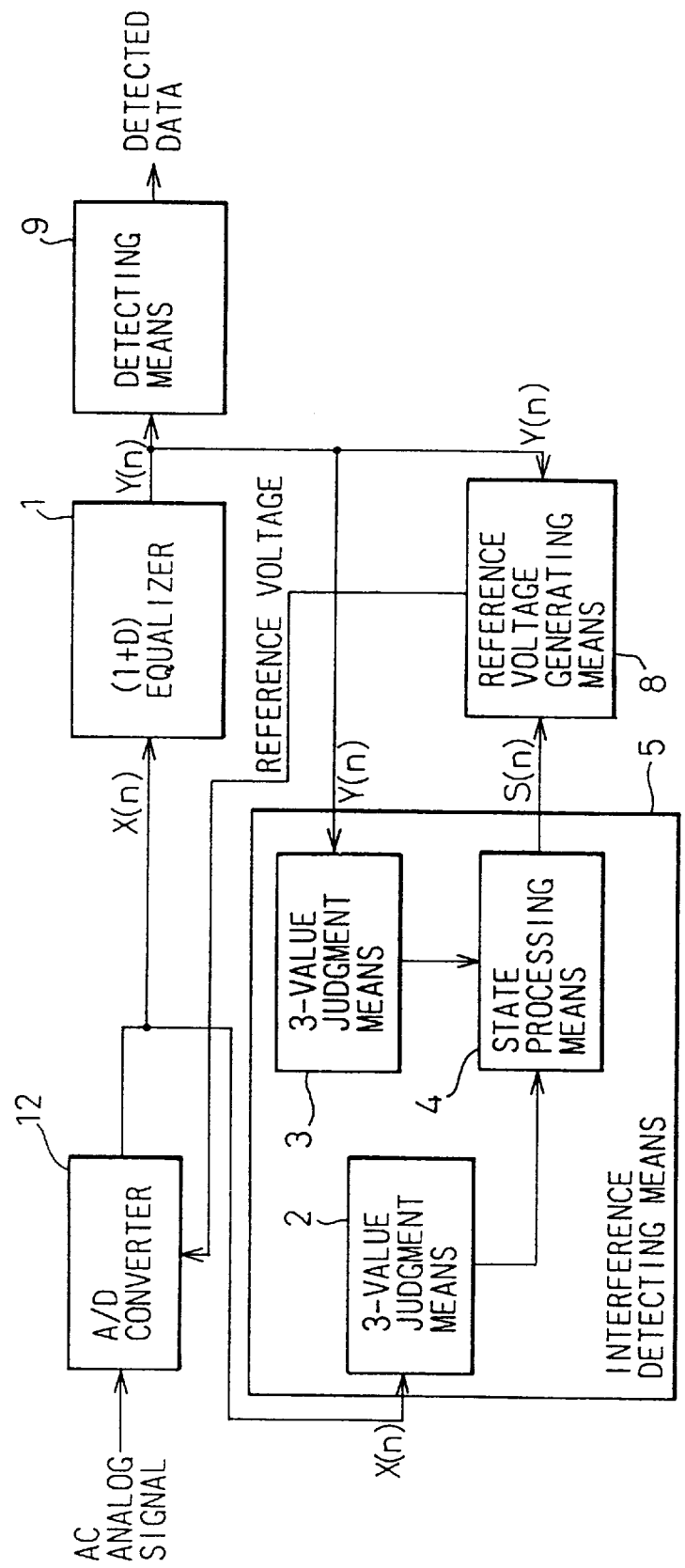
FIG. 28 is a block diagram which shows the basic configuration of the third aspect of an analog signal waveshaping circuit according to the present invention.

FIG. 28 shows a configuration which illustrates the principle of the third aspect of an analog signal waveshaping circuit according to the present invention. As shown in FIG. 28, in the third aspect of an analog signal waveshaping circuit according to the present invention, waveshaping is performed by detecting and compensating for the difference between the positive and negative peaks, with respect to the proper reference level of the input signal, while considering the DC offset component of the reference level. The third aspect of the analog waveshaping circuit is formed by an A/D converter 12, equalizing means 1, an interference detecting means 5, 3-value judging means 2 and 3, and state processing means 4, a reference voltage generating means 8 which classifies the signal Y(n) into 3 classes, based, on the interference state S(n) which is detected by the interference state detecting means 5, stores the values, and averages them, after which it generates a reference voltage, and a detecting means 9 which performs detection of data from the output of the equalizer 1.

The A/D converter 12 performs an A/D conversion of the input signal. The equalizing means 1 is connected as the stage after this A/D converter 12 and performs (1+D) equalization with the delay represented by D. If at the point in time n the input and output signals of the equalizing means 1 are X(n) and Y(n) respectively, and the interference state from the signal X(n) to the signal Y(n) is S(n), the 3-value judging means 2 performs a 3-value judgment of the signal X(n) with a threshold value of V'th. The 3-value judging means 3 performs a 3-value judgment of the signal Y(n) with a threshold value of Vth. The state processing means 4 calculates which of the 7 states Spp, S0p, Sp0, S00, Sn0, S0n, and Snn which can occur from the three values S'p, S'0, and S'n that the signal X(n) can take to the three values Sp, S0, and Sn that the signal Y(n) can take, has occurred, this being output as the interference state S(n). The reference voltage generating means 8 classifies the signal Y(n) into three classes, based on the interference state S(n), which is detected by the interference detecting means 5, which has 3-value judging means 2 and 3, and state processing means 4, into three classes and stores these, performing processing of the stored values after averaging processing of the stored values, after which the reference voltage is generated. The reference voltage generated by the reference voltage generating means 8 sets the reference of the A/D converter 12. The detecting means 9 performs detection of data from the output of the equalizing means 1.

Embodiments of this third aspect of an analog waveshaping circuit will be described using FIG. 29 and FIG. 30.

Figure 29:
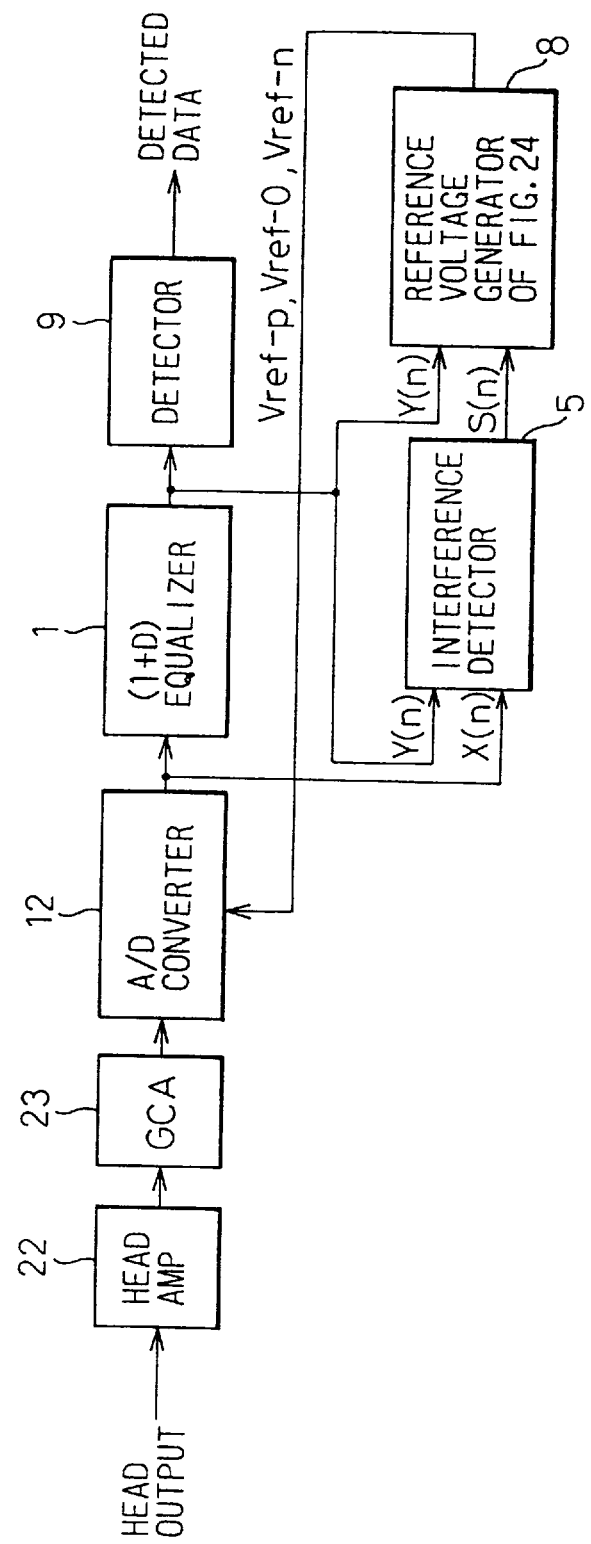
FIG. 29 is a circuit block diagram which shows the configuration of the fifteenth embodiment of an analog waveform waveshaping circuit according to the present invention.

FIG. 29 is a circuit block diagram which shows the configuration of the fifteenth embodiment of an analog waveshaping circuit according to the present invention. In the fifteenth embodiment, the difference with respect to the thirteenth embodiment described using FIG. 24 is that the A/D converter 12 which was made part of the equalizer 1 in the thirteenth embodiment is, in the fifteenth embodiment, placed as the stage immediately before the equalizer 1. The reference voltages Vref-p, Vref-0, and Vref-n from the reference voltage generator 8 are input to the A/D converter 12 which is the stage immediately before the equalizer 1, these reference voltages serving to set the three references for the A/D converter 12. Other parts of the configuration are the same as the described with regard to FIG. 24. Therefore, common elements have been assigned the same reference numerals, and will not be explicitly described herein.

Figure 30:
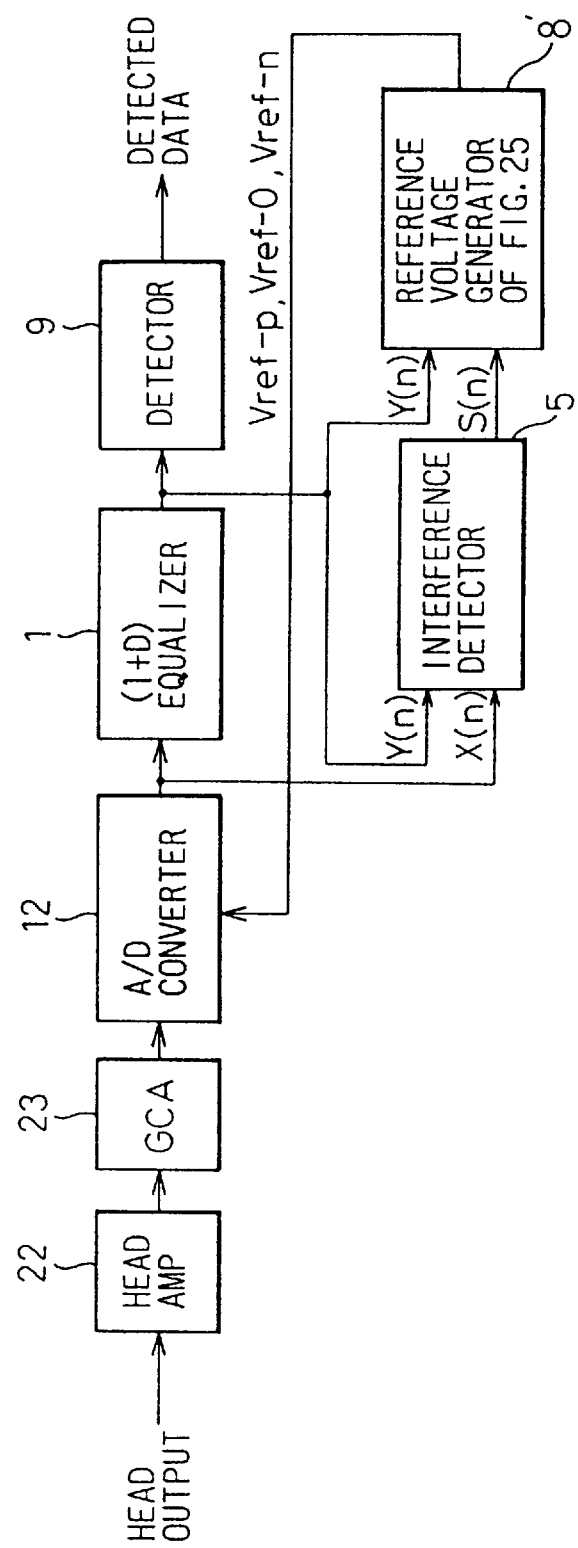
FIG. 30 is a circuit block diagram which shows the configuration of the sixteenth embodiment of an analog waveform waveshaping circuit according to the present invention.

FIG. 30 shows the configuration of the sixteenth embodiment of an analog waveshaping circuit according to the present invention, this being a variation of the fifteenth embodiment. In the fifteen embodiment described using FIG. 27, the reference voltage generator 8 described using FIG. 24 was used, whereas in this sixteenth embodiment, this reference voltage generator 8 described using FIG. 24 is replaced by the reference voltage generator 8' described using FIG. 26, other parts of the configuration being the same. Therefore, common elements have been assigned the same reference numerals, and will not be explicitly described herein.

Figure 31:
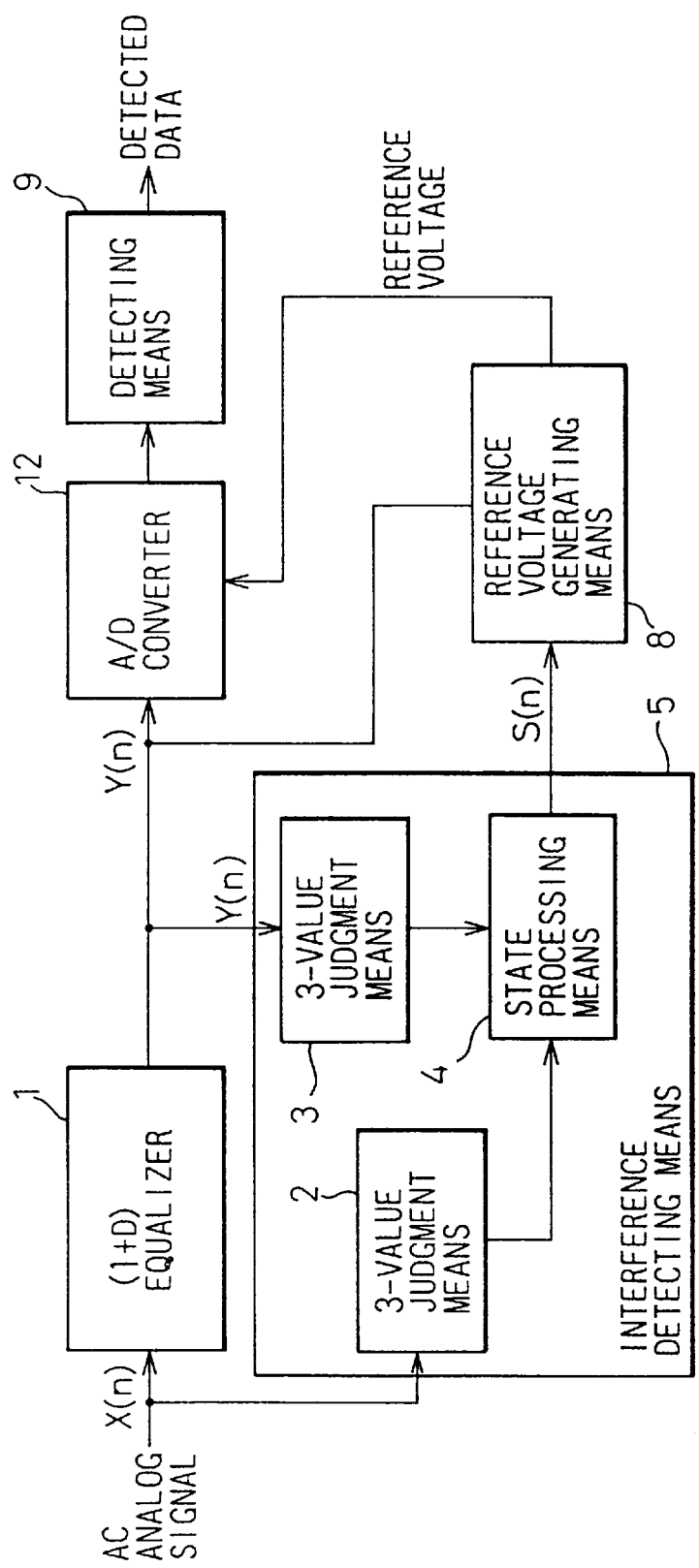
FIG. 31 is a block diagram which shows the basic configuration of the fourth aspect of an analog signal waveshaping circuit according to the present invention.

FIG. 31 shows a configuration which illustrates the principle of the fourth aspect of an analog signal waveshaping circuit according to the present invention. As shown in FIG. 31, in the fourth aspect of an analog signal waveshaping circuit according to the present invention, waveshaping is performed by detecting and compensating the difference between the positive and negative peaks, with respect to the proper reference level of the input signal, while considering the DC offset component of the reference level. The fourth aspect of the analog waveshaping circuit is formed by a (1+D) equalizing means 1, an interference detecting means 5 which is formed by 3-value judging means 2 and 3, and state processing means 4, a reference voltage generating means 8, an A/D converter 12, and a detecting means 9.

The equalizing means 1 performs (1+D) equalization of an input signal, with the delay expressed as D. If at the point in time n the input and output signals of the equalizing means 1 are X(n) and Y(n) respectively, and the interference state from the signal X(n) to the signal Y(n) is S(n), the 3-value judging means 2 performs a 3-value judgment of the signal X(n) with a threshold value of V'th. The 3-value judging means 3 performs a 3-value judgment of the signal Y(n) with a threshold value of Vth. The state processing means 4 calculates which of the 7 states Spp, S0p, Sp0, S00, Sn0, S0n, and Snn which can occur from the three values S'p, S'0, and S'n that the signal X(n) can take to the three values Sp, S0, and Sn that the signal Y(n) can take, has occurred, this being output as the interference state S(n). The reference voltage generating means 8 classifies the signal Y(n) into three classes, based on the interference state S(n), which is detected by the interference detecting means 5, which has 3-value judging means 2 and 3, and the state processing means 4, into three classes and stores these, performing processing of the stored values after averaging processing of the stored values, after which the reference voltage is generated. The reference voltage generated by the reference voltage generating means 8 sets the reference of the A/D converter 12. The A/D converter 12 is connected immediately after the equalizing means 1, and performs A/D conversion of the signal Y(n). The detecting means 9 performs detection of data from the output of the A/D converter 12.

Embodiments of this fourth aspect of an analog waveshaping circuit will be described using FIG. 32 and FIG. 33.

Figure 32:
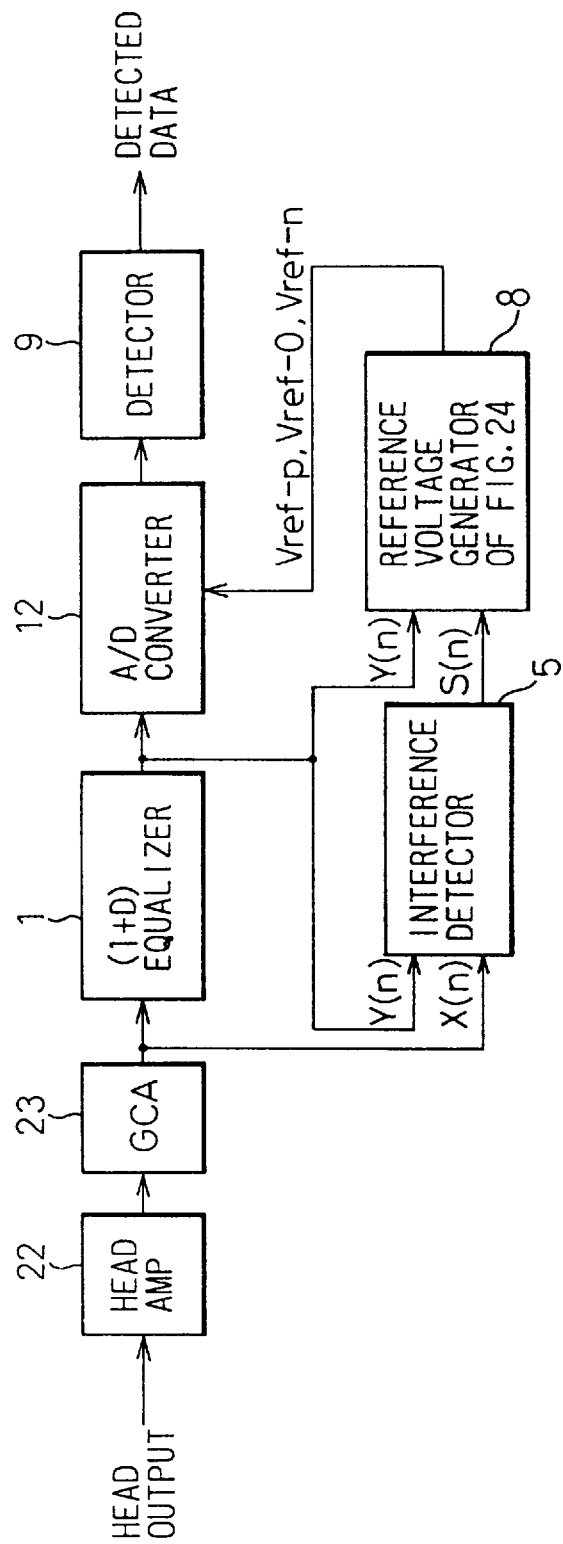
FIG. 32 is a circuit block diagram which shows the configuration of the seventeenth embodiment of an analog waveform waveshaping circuit according to the present invention.

FIG. 32 is a circuit block diagram which shows the configuration of the seventeenth embodiment of an analog waveshaping circuit according to the present invention. In the seventeenth embodiment, the difference with respect to the thirteenth embodiment described using FIG. 24 is that the A/D converter 12 which was made part of the equalizer 1 in the thirteenth embodiment is, in the seventeenth embodiment, placed between the equalizer 1 and the detector 9. The reference voltages Vref-p, Vref-0, and Vref-n from the reference voltage generator 8 are input to the A/D converter 12, these reference voltages serving to set the three references for the A/D converter 12. Other parts of the configuration are the same as the described with regard to FIG. 24. Therefore, common elements have been assigned the same reference numerals, and will not be explicitly described herein.

Figure 33:
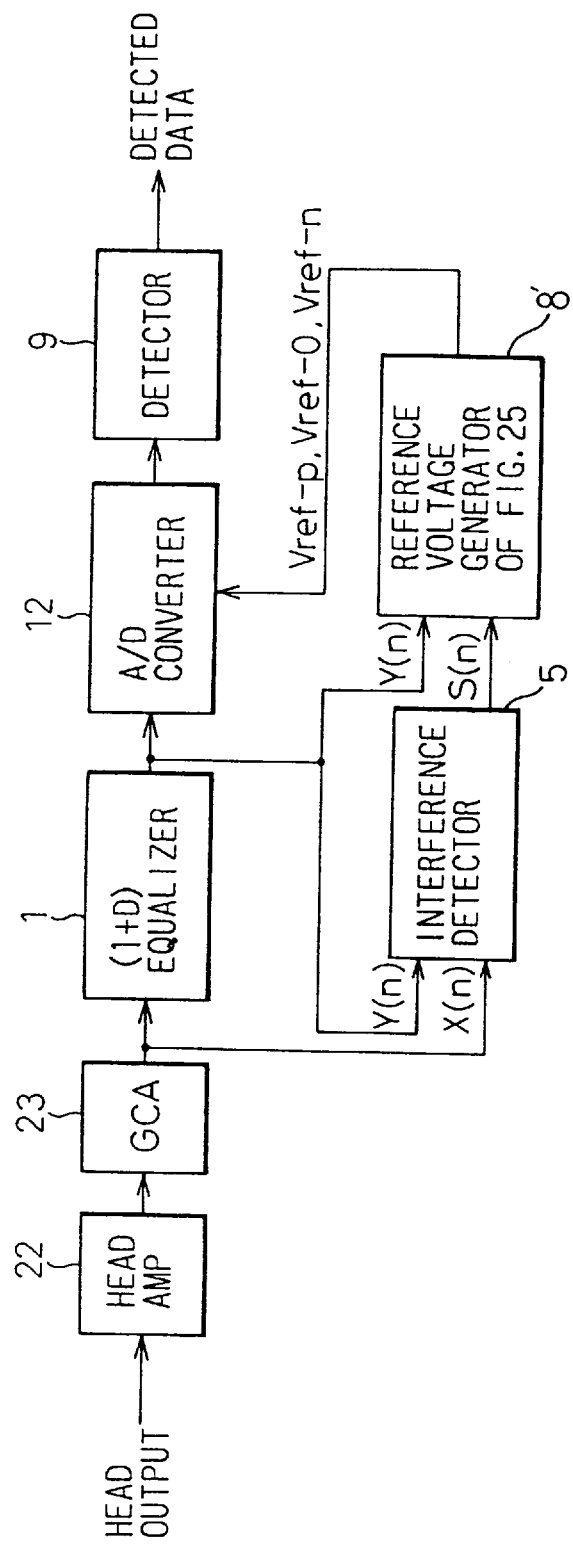
FIG. 33 is a circuit block diagram which shows the configuration of the eighteenth embodiment of an analog waveform waveshaping circuit according to the present invention.

FIG. 33 shows the configuration of the eighteenth embodiment of an analog waveshaping circuit according to the present invention, this being a variation of the seventeenth embodiment. In the seventeenth embodiment described using FIG. 32, the reference voltage generator 8 described using FIG. 25 was used, whereas in this eighteenth embodiment, this reference voltage generator 8 described using FIG. 25 is replaced by the reference voltage generator 8' described using FIG. 26, other parts of the configuration being the same. Therefore, common elements have been assigned the same reference numerals, and will not be explicitly described herein.

The foregoing has been a description of 18 types of embodiments of the present invention, in which a playback signal from a head is amplified by a head amplifier 22 and further amplified to a level appropriate for subsequent processing, by a GCA 23, the gain of which is controlled by the action of an AGC loop (not shown in the drawing). Subsequently, the signal passes through an A/D converter 12 and a (1+D) equalizer 1 and the like, after which it is input to a data detector 9, from which it is output as data. In doing this, after detection of interference state at the interference detector 5, the positive/negative asymmetry (that is the property that the positive and negative peak values are not the same with respect to the reference level) of the signal X(n) output from the GCA 23 and the DC offset component in the signal transmission path are compensated for in the case of embodiments 1 through 12 by the compensation constant generator 6 or 6' and the amplitude adjuster 7 or 7', and are compensated for in the case of embodiments 13 through 18 by the reference voltage generator 8 or 8', thereby enabling achievement of high accurate data demodulation in a magnetic disk apparatus which uses an MR head.

As described in detail above, according to the present invention, not only is consideration given to the positive/negative signal levels, but the DC offset component included in the AC analog signal is detected as well, thereby enabling compensation and waveshaping, based on the correct reference level, of an analog signal having positive and negative peak values that differ, this further enabling high-accuracy waveshaping of an AC analog signal having positive and negative peak values that mutually differ.

Furthermore, it is obvious that an analog signal waveshaping circuit of the present invention can be widely applied to a signal processing system in which a DC offset component is loaded, during transmission, onto an AC analog signal having positive and negative peaks with respect to a reference level.

What is claimed is:

1. An analog waveshaping circuit which performs waveshaping of an AC analog signal, having positive and negative amplitudes, with respect to a reference level, that are mutually different, by detecting and compensating for the difference between the positive and negative peak values, with respect to a proper reference level of said input signal, while considering a DC offset component of said reference level, said waveshaping circuit comprising:

means for equalizing, which performs (1+D) equalization of said input signal, where the delay is expressed as D;

means for detecting interference, and with input and output signals of said means for equalizing being X(n) and Y(n), respectively and the interference state from signal X(n) to signal Y(n) being S(n) at the time n, said means for detecting interference having a first means for 3-value judging which performs a 3-value judgment of said signal X(n) with a threshold value of V'th, a second means for judging which performs a 3-value judgment of said signal Y(n) with a threshold value of Vth, and means for processing states which calculates which of the states <1> Spp, a transition from a positive value S'p of the signal X(n) to a positive value Sp of the signal Y(n), <2> Sp0, a transition from a positive value S'p of the signal X(n) to a 0 value S0 of the signal Y(n), <3> S0p, a transition from a 0 value S'0 of the signal X(n) to a positive value Sp of the signal Y(n), <4> S00, a transition from a 0 value S'0 of the signal X(n) to a 0 value S0 of the signal Y(n), <5> S0n, a transition from a 0 value S'0 of the signal X(n) to a negative value Sn of the signal Y(n), <6> Sn0, a transition from a negative value S'n of the signal X(n) to a 0 value S0 of the signal Y(n), and <7> Snn, a transition from a negative value S'n of the signal X(n) to a negative value Sn of the signal Y(n), which can occur from the three values S'p, S'0, and S'n that the signal X(n) can take to the three values Sp, S0, and Sn that the signal Y(n) can take, has occurred, and which outputs said state as the interference state S(n);

means for compensation constant generation which classifies said interference state S(n), which is detected by said means for detecting interference, into at least three classes and stores these, performing processing of said stored values after averaging processing of said stored values, after which compensation constant and said DC offset level contained in said signal Y(n) are detected, said DC offset level being input to said means for equalizing;

means for amplitude compensation which has said signal Y(n) input to it, and which compensates for the amplitude of said signal in accordance with said amplitude compensation constant from said means for compensation constant generation; and means for detecting which detects data from an output of said means for amplitude compensation.

2. An analog waveshaping circuit according to claim 1, wherein said means for equalizing comprises an analog pre-filter, an A/D converter which performs an A/D conversion of the output of said filter, a cosine-type equalizer which digitally performs a cosine equalization of the output of said A/D converter, and a charge pump circuit, and wherein said charge pump circuit performs an integration operation based on the DC offset level information from said means for compensation constant generation, thereby setting the zero-level reference of said A/D converter.

3. An analog waveshaping circuit according to claim 1, wherein said means for equalizing has its output connected to an A/D converter which performs an A/D conversion thereof, and further wherein a charge pump circuit is connected between said A/D converter and said means for compensation constant generation, said charge pump circuit performing an integration operation based on the DC offset level information from said means for compensation constant generation, thereby setting the zero-level reference of said A/D converter.

4. An analog waveshaping circuit according to claim 1, wherein an A/D converter which converts the signal X(n) from said means for equalizing is connected to the input of said means for amplitude compensation, the zero-level reference of said A/D converter being set based on the DC offset level information from said means for compensation constant generation.

5. An analog waveshaping circuit according to claim 1, wherein said means for compensation constant generation comprises:

a selector which directs said input signal Y(n) to a first path when said interference state S(n) at the time n is Spp or S0p, directs said input signal Y(n) to a second path when said interference state S(n) at the time n is S00, and directs said input signal Y(n) to a third path when said interference state S(n) time n is Snn or S0n;

a first register, which is connected to said first path of said selector;

a second register, which is connected to said second path of said selector;

a third register, which is connected to said third path of said selector;

an averaging circuit which calculates and outputs the average of values stored in each said register every prescribed period of time;

a subtractor which subtracts the average value of values stored in said second register from the average value of values stored in said first register:

an adder which adds the average value of values stored in said second register to the average value of values stored in said third register; and a divider which calculates a compensation constant, based on the output from said subtractor and said adder, said average value of the values stored in said second register being output as a zero-level reference voltage.

6. An analog waveshaping circuit according to claim 1, wherein said means for compensation constant generation comprises:

a selector which directs said input signal Y(n) to a first path when said interference state S(n) at time n is Spp or S0p, directs said input signal Y(n) to a second path when said interference state S(n) at time n is S00, directs said input signal Y(n) to a third path when said interference state S(n) at time n is Sp0 or S0n, and directs the input signal Y(n) to a fourth path when the interference state S(n) at time n is Snn or S0n a first register, which is connected to said first path of said selector;

second register, which is connected to said second path of said selector;

a third register, which is connected to said third path of said selector;

a fourth register, which is connected to said fourth path of said selector;

an averaging circuit which calculates and outputs the average of values stored in each said register every prescribed period of time;

a subtractor which subtracts the average value of values stored in said third register from the average value of values stored in said first register:

an adder which adds the average value of values stored in said third register to the average value of values stored in said fourth register; and a divider which calculates a compensation constant, based on the output from said subtractor and said adder, said average value of the values stored in said second register being output as a zero-level reference voltage.

7. An analog waveshaping circuit according to claim 1, wherein said means for amplitude compensation comprises:

a selector which directs said input signal Y(n) to a first path when said input signal Y(n) is positive or zero, and which directs said input signal Y(n) to a second path when said input signal Y(n) is negative;

a first register, which is connected to said first path of said selector;

a second register, which is connected to said second path of said selector;

a multiplier which is connected to the output side of said registers, and which performs multiplication by a compensation constant that is input from said means for compensation constant generation; and another selector which is switched in concert with said selector, which outputs the signal from said multiplier when said input signal Y(n) is positive or zero, and which outputs the signal from said register when said input signal Y(n) is negative.

8. An analog waveshaping circuit according to claim 1, wherein said means for amplitude compensation comprises:

a selector which directs said input signal Y(n) to a first path when said input signal Y(n) is positive or zero, and which directs said input signal Y(n) to a second path when said input signal Y(n) is negative;

a first register, which is connected to said first path of said selector;

a second register, which is connected to said second path of said selector;

a multiplier which is connected to the output side of said registers, and which performs multiplication by a compensation constant that is input from said means for compensation constant generation; and another selector which is switched in concert with said selector, which outputs the signal from said first register when said input signal Y(n) is positive or zero, and which outputs the signal from said multiplier when said input signal Y(n) is negative.

9. An analog waveshaping circuit according to claim 1, wherein said analog signal is a signal read from a magnetic disk apparatus, and wherein waveshaping processing of said analog signal is performed constantly when reading data.

10. An analog waveshaping circuit according to claim 1, wherein said analog signal is a signal read from a magnetic disk apparatus, and wherein, in a magnetic disk apparatus, a pattern area is provided ahead of the data area for the purpose of detection and compensation of the difference in the positive and negative peaks of playback data, and further wherein a memory means for storing a compensation value if provided, detection and compensation of the difference in the positive and negative peaks from an analog signal read from this pattern area being performed, this compensation value being stored in said memory means and used when reading from the data area.

11. An analog waveshaping circuit according to claim 10, wherein the compensation value stored in said memory means is determined and stored therein by means of an analog signal which is read out from said pattern area at the time said analog waveshaping circuit is manufactured.

* * * * *